(12) United States Patent
Wang et al.

(10) Patent No.: US 12,739,427 B2
(45) Date of Patent: Sep. 15, 2026

(54) DATA STORAGE METHOD, AND APPARATUS ENABLING SELECTIVE AND EFFICIENT DATA READING

(71) Applicants: TSINGHUA UNIVERSITY, Beijing (CN); HUAWEI TECHNOLOGIES CO., LTD., Shenzhen (CN)

(72) Inventors: Yaoyuan Wang, Beijing (CN); Mingsheng Long, Beijing (CN); Kaichao You, Shenzhen (CN); Ziyang Zhang, Shenzhen (CN); Ying Wang, Shenzhen (CN); Yunlong Zhan, Beijing (CN); Jianxing Liao, Shenzhen (CN); Jianmin Wang, Beijing (CN); Kanwen Wang, Beijing (CN)

(73) Assignees: Tsinghua University, Beijing (CN); Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/013,825

(22) Filed: Jan. 8, 2025

(65) Prior Publication Data

US 2025/0150619 A1 May 8, 2025

Related U.S. Application Data

(63) Continuation of application No. PCT/CN2023/104799, filed on Jun. 30, 2023.

(30) Foreign Application Priority Data

Jul. 8, 2022 (CN) ......................... 202210806173.7

(51) Int. Cl.
*H04N 19/42* (2014.01)
*H04N 19/587* (2014.01)

(52) U.S. Cl.
CPC .......... *H04N 19/587* (2014.11); *H04N 19/42* (2014.11)

(58) Field of Classification Search
None
See application file for complete search history.

(56) References Cited

U.S. PATENT DOCUMENTS 9,158,974 B1 * 10/2015 Laska .................. H04N 23/667
9,853,986 B2 * 12/2017 Dash ..................... G06F 21/552
(Continued)

FOREIGN PATENT DOCUMENTS

CN 112579541 A 3/2021
CN 113645468 A 11/2021
(Continued)

*Primary Examiner* — Tyler W. Sullivan
(74) *Attorney, Agent, or Firm* — Leydig, Voit & Mayer, Ltd.

(57) ABSTRACT

This application relates to a data storage method, a reading method, an apparatus, a storage medium, and a program product. The data storage method is applied to a processor and includes: (S1) obtaining event data; (S2) processing the event data, to obtain a plurality of data blocks and a plurality of corresponding metadata blocks, where each data block includes a part of processed event data, and each metadata block includes a start time, an end time, a quantity, and a compression manner of event data in a data block corresponding to the metadata block, and a storage address of the data block; and (S3) storing the plurality of data blocks into a first storage area, and storing the plurality of metadata blocks into a second storage area.

16 Claims, 8 Drawing Sheets

(56) References Cited

U.S. PATENT DOCUMENTS

| | | | | |
|---|---|---|---|---|
| 10,600,189 | B1 * | 3/2020 | Bedikian | G06T 7/73 |
| 11,190,753 | B1 * | 11/2021 | Meier | G06T 19/006 |
| 2014/0359771 | A1 | 12/2014 | Dash et al. | |
| 2021/0042931 | A1 * | 2/2021 | Chen | G06V 10/10 |

FOREIGN PATENT DOCUMENTS

| | | | |
|---|---|---|---|
| CN | 112286867 | B | 3/2022 |
| CN | 114491145 | A | 5/2022 |

* cited by examiner

```
1596162799150829 291 29 0
1596162799150839 212 80 0
1596162799150841 261 211 1
1596162799150851 84 62 0
1596162799150860 260 203 1
1596162799150862 264 171 1
1596162799150863 262 187 1
1596162799150868 266 99 1
1596162799150869 266 100 1
1596162799150870 265 130 1
1596162799150871 186 10 0
1596162799150871 266 127 1
1596162799150882 266 114 1
1596162799150897 215 18 0
1596162799150902 296 108 0
1596162799150908 267 122 1
```

DATA STORAGE METHOD, AND APPARATUS ENABLING SELECTIVE AND EFFICIENT DATA READING

CROSS-REFERENCE TO RELATED APPLICATIONS

This application is a continuation of International Application No. PCT/CN2023/104799, filed on Jun. 30, 2023, which claims priority to Chinese Patent Application No. 202210806173.7, filed on Jul. 8, 2022. The disclosures of the aforementioned applications are hereby incorporated by reference in their entireties.

TECHNICAL FIELD

This disclosure relates to the data processing field, and in particular, to a data storage method, a reading method, an apparatus, a storage medium, and a program product.

BACKGROUND

An event camera is a new type of camera that appears in recent years. The event camera is a camera that captures dynamic changes in a scene in an event-driven manner. An imaging principle of the event camera is that when an object or light in a real scene changes, the event camera generates some pixel-level outputs (that is, events), and generates a spatial-temporal data stream including a series of events, that is, an event stream.

Because a time resolution of event data is very high, a volume of data output by the event camera is much greater than that output by a conventional color camera. Usually, the data needs to be compressed and stored, and is read after being decompressed and then is used. In addition, a form of the event data is streaming data. In this case, a form of reading the event data is extracting data in a period of time. When the data is read based on a common compression algorithm, the data needs to be decompressed as a whole before a data reading operation is performed. This is inefficient. Therefore, a data storage solution is urgently needed, so that when the data is read, the data can be read without decompressing the data as a whole, thereby improving data reading efficiency.

SUMMARY

In view of this, a data storage method, a reading method, an apparatus, a storage medium, and a program product are provided. According to the data storage method in embodiments of this disclosure, when event data is read, the event data that needs to be read can be read without decompressing all data blocks, so that selective data reading can be supported, thereby improving data reading efficiency.

According to a first aspect, an embodiment of this disclosure provides a data storage method. The method is applied to a processor. The method includes: obtaining event data; processing the event data, to obtain a plurality of data blocks and a plurality of corresponding metadata blocks, where each data block includes a part of processed event data, and each metadata block includes a start time, an end time, a quantity, and a compression manner of event data in a data block corresponding to the metadata block, and a storage address of the data block; and storing the plurality of data blocks into a first storage area, and storing the plurality of metadata blocks into a second storage area.

According to the data storage method in this embodiment of this disclosure, the event data is obtained, and the event data is processed, to obtain the plurality of data blocks and the plurality of corresponding metadata blocks. Each data block includes the part of processed event data, so that block compression can be performed on the event data. Each metadata block includes the start time, the end time, the quantity, and the compression manner of the event data in the data block corresponding to the metadata block, and the storage address of the data block, so that the metadata block can indicate event data information in the data block corresponding to the metadata block. The plurality of data blocks are stored in the first storage area, and the plurality of metadata blocks are stored in the second storage area. In this partitioned storage manner, the metadata block and the data block can be separately read. In this way, when the event data is read, a data block that meets a requirement can be found based on a time interval of event data that needs to be read, that is, based on time information included in a metadata block. In other words, a query of the time interval is supported. The event data that needs to be read can be obtained by correspondingly decompressing the data block based on a compression manner of the data block that meets the requirement. On-demand reading can be supported without decompressing all the data blocks. Only related data needs to be read, and not all data needs to be read. Therefore, according to the data storage method in this embodiment of this disclosure, when the event data is read, the event data that needs to be read can be read without decompressing all the data blocks, thereby supporting selective data reading and improving data reading efficiency.

With reference to the first aspect, in a first possible implementation of the data storage method, the processing the event data, to obtain a plurality of data blocks and a plurality of corresponding metadata blocks includes: performing chunking on the event data based on time information and/or space information in the event data, to obtain a plurality of event chunks; processing each event chunk, to obtain a plurality of sequences, where the plurality of sequences include time information, space information, and event content information of event data in the event chunk, a quantity of elements in each sequence is equal to a quantity of pieces of event data in the event chunk, an element value in each sequence is an integer greater than or equal to 0, and a quantity of elements whose element values are greater than a first threshold is greater than a quantity of elements whose element values are less than or equal to the first threshold; for each sequence, selecting, from a preset compression manner, a compression manner matching the sequence, and compressing the sequence based on the selected compression manner, to obtain compressed data; obtaining one data block based on a plurality of pieces of compressed data obtained based on the plurality of sequences corresponding to each event chunk; and obtaining, based on time information in event data included in each event chunk, a quantity of pieces of event data, a selected compression manner, and a storage address of the data block, to obtain one metadata block corresponding to the data block.

In this manner, the original redundant event data may be converted into a form in which a large part of data values are small and a small part of data values are large and that is easy for compression. In this way, data storage costs can be reduced during compression.

With reference to the first possible implementation of the first aspect, in a second possible implementation of the data storage method, the plurality of sequences include a first sequence, and the first sequence includes the time information of the event data in the event chunk. The processing each event chunk, to obtain a plurality of sequences includes: sorting the event data in the event chunk based on a time information order, and performing subtraction between time information of each piece of event data and time information of a previous piece of event data, to obtain a first group of differences; and using time information of event data ranking first and all differences in the first group of differences respectively as elements in the first sequence, to obtain the first sequence.

In this manner, storage efficiency of the event data can be improved, and a capacity requirement for the first storage area can be lowered.

With reference to the second possible implementation of the first aspect, in a third possible implementation of the data storage method, the plurality of sequences further include a second sequence, a third sequence, and a fourth sequence. The second sequence includes first-dimensional space information of the event data in the event chunk. The third sequence includes second-dimensional space information of the event data in the event chunk. The fourth sequence includes the event content information of the event data in the event chunk. The processing each event chunk, to obtain a plurality of sequences further includes: performing subtraction between first-dimensional space information of each piece of event data and first-dimensional space information of a previous piece of event data, to obtain a second group of differences; converting, by using a preset first function, a negative number in first-dimensional space information of the event data ranking first and the second group of differences into a positive number; obtaining the second sequence based on converted first-dimensional space information of the event data ranking first and each difference in a converted second group of differences; performing subtraction between second-dimensional space information of each piece of event data and second-dimensional space information of the previous piece of event data, to obtain a third group of differences; converting, by using the preset first function, a negative number in second-dimensional space information of the event data ranking first and the third group of differences into a positive number; obtaining the third sequence based on converted second-dimensional space information of the event data ranking first and each difference in a converted third group of differences; performing subtraction between event content information of each piece of event data and event content information of the previous piece of event data, to obtain a fourth group of differences; converting, by using the preset first function, a negative number in event content information of the event data ranking first and the fourth group of differences into a positive number; and obtaining the fourth sequence based on converted event content information of the event data ranking first and each difference in a converted fourth group of differences.

In this manner, the plurality of sequences obtained by processing the event chunk can indicate information about event data with a larger data volume in the event chunk by using a smaller data volume, thereby reducing a data redundancy degree.

With reference to the second possible implementation of the first aspect, in a fourth possible implementation of the data storage method, the plurality of sequences further include a fifth sequence and a sixth sequence. The fifth sequence and the sixth sequence include the space information of the event data in the event chunk. The fifth sequence further includes the event content information of the event data in the event chunk. The processing each event chunk, to obtain a plurality of sequences further includes: processing event content information of each piece of event data and first-dimensional space information or second-dimensional space information of the event data by using a preset second function, to obtain synthetic information; performing subtraction between synthetic information of each piece of event data and synthetic information of a previous piece of event data, to obtain a fifth group of differences; converting, by using a preset first function, a negative number in synthetic information of the event data ranking first and the fifth group of differences into a positive number; obtaining the fifth sequence based on converted synthetic information of the event data ranking first and each difference in a converted fifth group of differences; performing subtraction between second-dimensional space information of each piece of event data and second-dimensional space information of the previous piece of event data, or performing subtraction between first-dimensional space information of each piece of event data and first-dimensional space information of the previous piece of event data, to obtain a sixth group of differences; converting, by using the preset first function, a negative number in second-dimensional information or first-dimensional information of the event data ranking first and the sixth group of differences into a positive number; and obtaining the sixth sequence based on converted second-dimensional information or first-dimensional information of the event data ranking first and each difference in a converted sixth group of differences.

In this manner, a manner of obtaining the plurality of sequences through processing is more flexible, and a problem in which a modern programming language is unfriendly to bit-level operations can be avoided, thereby reducing complexity of subsequent further processing of the plurality of sequences.

With reference to the first possible implementation of the first aspect, in a fifth possible implementation of the data storage method, when values of all elements in the sequence are the same and bit widths of all the elements are all b, the preset compression manner includes a first compression manner. In the first compression manner, the values of all the elements in the sequence are recorded by using a b-bit binary number. A value of b is recorded by using a B-bit binary number. Herein, both b and B are positive integers.

In this manner, when a constant sequence in which elements have the same values and bit widths are all b is compressed in the first compression manner, a data volume of compressed data is very low, to implement effect of reducing data storage costs.

With reference to the first possible implementation of the first aspect, in a sixth possible implementation of the data storage method, when a largest bit width of elements in the sequence is b, the preset compression manner includes a second compression manner. In the second compression manner, a value of each element in the sequence is recorded by using a b-bit binary number. A value of b is recorded by using a B-bit binary number. Herein, both b and B are positive integers.

In this manner, when a non-constant sequence is compressed in the second compression manner, a data volume of compressed data is very low, to implement effect of reducing data storage costs. In addition, there are more choices of compression manners, thereby improving sequence compression flexibility.

With reference to the first possible implementation of the first aspect, in a seventh possible implementation of the data storage method, when bit widths of at least two elements in the sequence are different, and a largest bit width of elements in the sequence is b, the preset compression manner includes a third compression manner. In the third compression manner, a less than b is set, values of b and a each are recorded by using a B-bit binary number, low-a-bit data in a binary form of each element in the sequence is recorded by using a binary number whose bit width is equal to a, high-(b-a)-bit data in the binary form of the element in the sequence is recorded by using a binary number whose bit width is equal to b-a, and whether each element includes high-(b-a)-bit data is recorded by using a binary number whose bit width is equal to a quantity of elements in the sequence. Herein, b, B, and a are all positive integers.

In this manner, when a non-constant sequence is compressed in the third compression manner, a data volume of compressed data is very low, to implement effect of reducing data storage costs. In addition, there are more choices of compression manners, thereby improving sequence compression flexibility.

According to a second aspect, an embodiment of this disclosure provides a data reading method. The method is applied to a processor. The method includes: obtaining a plurality of metadata blocks from a second storage area, where the plurality of metadata blocks correspond to a plurality of data blocks, each data block includes a part of processed event data, and each metadata block includes a start time, an end time, a quantity, and a compression manner of event data in a data block corresponding to the metadata block, and a storage address of the data block; finding, in the plurality of metadata blocks, at least one metadata block that includes a start time and an end time between which any time point is in a target time interval; and obtaining, from a first storage area based on a storage address in the at least one found metadata block, at least one data block corresponding to the at least one found metadata block, and processing the data block based on a compression manner in a found metadata block corresponding to each data block, to obtain to-be-read event data.

According to the data reading method in this embodiment of this disclosure, the plurality of metadata blocks are obtained from the second storage area, and the at least one metadata block whose start time and/or end time are/is in the target time interval is found from the plurality of metadata blocks, so that the at least one found metadata block can be a metadata block that has an intersection with the target time interval. In addition, the metadata block corresponds to the data block. Each data block includes the part of processed event data. Each metadata block includes the start time, the end time, the quantity, and the compression manner of the event data in the data block corresponding to the metadata block, and the storage address of the data block. In this case, the part of processed event data included in the data block corresponding to the at least one metadata block includes the to-be-read event data. In other words, a query of a time interval is supported. The at least one data block corresponding to the at least one found metadata block may be obtained from the first storage area based on the storage address of the at least one found metadata block, to avoid obtaining of all the data blocks, thereby reducing data processing costs required for obtaining the data block and data storage costs required for storing the obtained data block by the processor. The data block is processed based on the compression manner in the found metadata block corresponding to each data block, to obtain the to-be-read event data. On-demand reading can be supported without decompressing all the data blocks. Only related data needs to be read, and not all data needs to be read. Therefore, according to the data reading method in this embodiment of this disclosure, when the event data is read, the event data that needs to be read can be read without obtaining and decompressing all the data blocks, thereby supporting selective data reading, reducing data processing costs and data storage costs, and improving data reading efficiency.

With reference to the second aspect, in a first possible implementation of the data reading method, the processing the data block based on a compression manner in a found metadata block corresponding to each data block, to obtain to-be-read event data includes: performing decompression processing on the data block based on the compression manner in the found metadata block corresponding to each data block, to obtain a plurality of decompressed sequences, where the plurality of sequences include time information, space information, and event content information of event data in an event chunk corresponding to the data block, a quantity of elements in each sequence is equal to a quantity of pieces of event data in the event chunk, an element value in each sequence is an integer greater than or equal to 0, and a quantity of elements whose element values are greater than a first threshold is greater than a quantity of elements whose element values are less than or equal to the first threshold; processing the plurality of decompressed sequences obtained through decompression processing performed on each data block, to obtain the event chunk corresponding to each data block; and using, as the read event data, event data that is in event data included in all event chunks and whose time information is in the target time interval.

In this manner, each data block may be decompressed to obtain a plurality of sequences, and then an original event chunk may be restored based on the plurality of sequences. Therefore, storing the event data in a data block form does not affect accuracy of subsequently using the event data in the event chunk obtained through decompression. In this way, it can be ensured that both data storage costs and data reading costs are low. In addition, data accuracy can be ensured.

With reference to the first possible implementation of the second aspect, in a second possible implementation of the data reading method, the plurality of sequences include a first sequence. The first sequence includes the time information of the event data in the event chunk. The processing the plurality of decompressed sequences obtained through decompression processing performed on each data block, to obtain the event chunk corresponding to each data block includes: for any first sequence, performing summation on each element in the first sequence and all elements before the element, to obtain a first group of sum values; and using a first element in the first sequence and all sum values in the first group of sum values respectively as the time information of the event data in the event chunk corresponding to the first sequence.

In this manner, for each first sequence, time information in an event chunk corresponding to the first sequence may be obtained through processing, and the event chunk corresponding to the first sequence may be obtained with reference to space information and event content information in the event chunk corresponding to the first sequence.

With reference to the second possible implementation of the second aspect, in a third possible implementation of the data reading method, the plurality of sequences further include a second sequence, a third sequence, and a fourth sequence. The second sequence includes first-dimensional space information of the event data in the event chunk. The third sequence includes second-dimensional space information of the event data in the event chunk. The fourth sequence includes the event content information of the event data in the event chunk. The processing the plurality of decompressed sequences obtained through decompression processing performed on each data block, to obtain the event chunk corresponding to each data block further includes: for any second sequence, third sequence, or fourth sequence, converting each element in the second sequence, the third sequence, or the fourth sequence by using an inverse function of a preset first function, to obtain a converted element; performing summation on each converted element and all elements before the element, to obtain a second group of sum values, a third group of sum values, or a fourth group of sum values; and using a converted first element and each sum value in a converted second group of sum values as the first-dimensional space information of the event data in the event chunk corresponding to the second sequence, or using a converted first element and each sum value in a converted third group of sum values as the second-dimensional space information of the event data in the event chunk corresponding to the third sequence, or using a converted first element and each sum value in a converted fourth group of sum values as the event content information of the event data in the event chunk corresponding to the fourth sequence.

In this manner, for each second sequence/third sequence/fourth sequence, the space information/event content information in the event chunk corresponding to the second sequence/third sequence/fourth sequence may be obtained through processing, and the event chunk corresponding to the second sequence/third sequence/fourth sequence may be obtained with reference to the time information in the event chunk corresponding to the second sequence/third sequence/fourth sequence, so that application of the data reading method is more flexible.

With reference to the second possible implementation of the second aspect, in a fourth possible implementation of the data reading method, the plurality of sequences further include a fifth sequence and a sixth sequence. The fifth sequence and the sixth sequence include the space information of the event data in the event chunk. The fifth sequence further includes the event content information of the event data in the event chunk. The processing the plurality of decompressed sequences obtained through decompression processing performed on each data block, to obtain the event chunk corresponding to each data block further includes: for any fifth sequence, converting each element in the fifth sequence by using an inverse function of a preset first function, to obtain a converted element; performing summation on each converted element and all elements before the element, to obtain a fifth group of sum values; processing a converted first element and each sum value in the fifth group of sum values by using an inverse function of a preset second function, to obtain event content information of each piece of event data and first-dimensional space information or second-dimensional space information of the event data; for any sixth sequence, converting each element in the sixth sequence by using the inverse function of the preset first function, to obtain a converted element; performing summation on each converted element and all elements before the element, to obtain a sixth group of sum values; and using a converted first element and each sum value in a converted sixth group of sum values as second-dimensional space information or first-dimensional space information of the event data in the event chunk corresponding to the sixth sequence.

In this manner, for each fifth sequence, space information and event content information in an event chunk corresponding to the fifth sequence may be obtained through processing; and for each sixth sequence, space information in an event chunk corresponding to the sixth sequence may be obtained through processing. The event chunk corresponding to the fifth sequence/the sixth sequence may be obtained with reference to time information in the event chunk corresponding to the fifth sequence/the sixth sequence. In this way, application of the data reading method is more flexible.

With reference to the first possible implementation of the second aspect, in a fifth possible implementation of the data reading method, the data block includes a plurality of pieces of compressed data. The performing decompression processing on the data block based on the compression manner in the found metadata block corresponding to each data block, to obtain a plurality of decompressed sequences includes: when the compression manner corresponding to the metadata block indicates that a compression manner of any compressed data is a first compression manner, reading a B-bit binary number from the compressed data; determining a value of b based on a decimal form of the B-bit binary number, and further reading a b-bit binary number from the compressed data; and using a decimal form of the b-bit binary number as a value of each element in the sequence, to obtain a decompressed sequence, where both b and B are positive integers.

In this manner, data compressed in the first compression manner can be decompressed, and a sequence after decompression can be the same as a sequence before compression, thereby ensuring decompression accuracy.

With reference to the first possible implementation of the second aspect, in a sixth possible implementation of the data reading method, the data block includes a plurality of pieces of compressed data, and the performing decompression processing on the data block based on the compression manner in the found metadata block corresponding to each data block, to obtain a plurality of decompressed sequences includes: when the compression manner corresponding to the metadata block indicates that a compression manner of any compressed data is a second compression manner, reading a B-bit binary number from the compressed data; determining a value of b based on a decimal form of the B-bit binary number; further sequentially reading a b-bit binary number from the compressed data until a quantity of read b-bit binary numbers is equal to a quantity that is of pieces of event data and that is indicated by the metadata block; and using a decimal form of the sequentially read b-bit binary number as a value of each element in the sequence, to obtain a decompressed sequence, where both b and B are positive integers.

In this manner, data compressed in the second compression manner can be decompressed, and a sequence after decompression can be the same as a sequence before compression, thereby ensuring decompression accuracy.

With reference to the first possible implementation of the second aspect, in a seventh possible implementation of the data reading method, the data block includes a plurality of pieces of compressed data, and the performing decompression processing on the data block based on the compression manner in the found metadata block corresponding to each data block, to obtain a plurality of decompressed sequences includes: when the compression manner corresponding to the metadata block indicates that a compression manner of any compressed data is a third compression manner, sequentially reading two B-bit binary numbers from the compressed data; determining a value of b and a value of a respectively based on decimal forms of the two B-bit binary numbers; further sequentially reading an a-bit binary number from the compressed data until a quantity of read a-bit binary numbers is equal to a quantity that is of pieces of event data and that is indicated by the metadata block; using the sequentially read a-bit binary number as low a bits of each element in the sequence; further reading, from the compressed data, a binary number whose bit width is equal to the quantity that is of pieces of event data and that is indicated by the metadata block, and determining, based on each bit of the binary number, whether each element in the sequence includes high-(b-a)-bit data; further sequentially reading a (b-a)-bit binary number from the compressed data until a quantity of read (b-a)-bit binary numbers is equal to a quantity of determined elements that each include high-(b-a)-bit data; and using the read (b-a)-bit binary number as high b-a bits of an element that includes high-(b-a)-bit data in the sequence, where b, B, and a are all positive integers.

In this manner, data compressed in the third compression manner can be decompressed, and a sequence after decompression can be the same as a sequence before compression, thereby ensuring decompression accuracy.

According to a third aspect, an embodiment of this disclosure provides a data storage apparatus. The apparatus is used in a processor. The apparatus includes: a first obtaining module, configured to obtain event data; a first processing module, configured to process the event data, to obtain a plurality of data blocks and a plurality of corresponding metadata blocks, where each data block includes a part of processed event data, and each metadata block includes a start time, an end time, a quantity, and a compression manner of event data in a data block corresponding to the metadata block, and a storage address of the data block; and a first storage module, configured to store the plurality of data blocks into a first storage area, and store the plurality of metadata blocks into a second storage area.

With reference to the third aspect, in a first possible implementation of the data storage apparatus, the processing the event data, to obtain a plurality of data blocks and a plurality of corresponding metadata blocks includes: performing chunking on the event data based on time information and/or space information in the event data, to obtain a plurality of event chunks; processing each event chunk, to obtain a plurality of sequences, where the plurality of sequences include time information, space information, and event content information of event data in the event chunk, a quantity of elements in each sequence is equal to a quantity of pieces of event data in the event chunk, an element value in each sequence is an integer greater than or equal to 0, and a quantity of elements whose element values are greater than a first threshold is greater than a quantity of elements whose element values are less than or equal to the first threshold; for each sequence, selecting, from a preset compression manner, a compression manner matching the sequence, and compressing the sequence based on the selected compression manner, to obtain compressed data; obtaining one data block based on a plurality of pieces of compressed data obtained based on the plurality of sequences corresponding to each event chunk; and obtaining, based on time information in event data included in each event chunk, a quantity of pieces of event data, a selected compression manner, and a storage address of the data block, to obtain one metadata block corresponding to the data block.

With reference to the first possible implementation of the third aspect, in a second possible implementation of the data storage apparatus, the plurality of sequences include a first sequence, and the first sequence includes the time information of the event data in the event chunk. The processing each event chunk, to obtain a plurality of sequences includes: sorting the event data in the event chunk based on a time information order, and performing subtraction between time information of each piece of event data and time information of a previous piece of event data, to obtain a first group of differences; and using time information of event data ranking first and all differences in the first group of differences respectively as elements in the first sequence, to obtain the first sequence.

With reference to the second possible implementation of the third aspect, in a third possible implementation of the data storage apparatus, the plurality of sequences further include a second sequence, a third sequence, and a fourth sequence. The second sequence includes first-dimensional space information of the event data in the event chunk. The third sequence includes second-dimensional space information of the event data in the event chunk. The fourth sequence includes the event content information of the event data in the event chunk. The processing each event chunk, to obtain a plurality of sequences further includes: performing subtraction between first-dimensional space information of each piece of event data and first-dimensional space information of a previous piece of event data, to obtain a second group of differences; converting, by using a preset first function, a negative number in first-dimensional space information of the event data ranking first and the second group of differences into a positive number; obtaining the second sequence based on converted first-dimensional space information of the event data ranking first and each difference in a converted second group of differences; performing subtraction between second-dimensional space information of each piece of event data and second-dimensional space information of the previous piece of event data, to obtain a third group of differences; converting, by using the preset first function, a negative number in second-dimensional space information of the event data ranking first and the third group of differences into a positive number; obtaining the third sequence based on converted second-dimensional space information of the event data ranking first and each difference in a converted third group of differences; performing subtraction between event content information of each piece of event data and event content information of the previous piece of event data, to obtain a fourth group of differences; converting, by using the preset first function, a negative number in event content information of the event data ranking first and the fourth group of differences into a positive number; and obtaining the fourth sequence based on converted event content information of the event data ranking first and each difference in a converted fourth group of differences.

With reference to the second possible implementation of the third aspect, in a fourth possible implementation of the data storage apparatus, the plurality of sequences further include a fifth sequence and a sixth sequence. The fifth sequence and the sixth sequence include the space information of the event data in the event chunk. The fifth sequence further includes the event content information of the event data in the event chunk. The processing each event chunk, to obtain a plurality of sequences further includes: processing event content information of each piece of event data and first-dimensional space information or second-dimensional space information of the event data by using a preset second function, to obtain synthetic information; performing subtraction between synthetic information of each piece of event data and synthetic information of a previous piece of event data, to obtain a fifth group of differences; converting, by using a preset first function, a negative number in synthetic information of the event data ranking first and the fifth group of differences into a positive number; obtaining the fifth sequence based on converted synthetic information of the event data ranking first and each difference in a converted fifth group of differences; performing subtraction between second-dimensional space information of each piece of event data and second-dimensional space information of the previous piece of event data, or performing subtraction between first-dimensional space information of each piece of event data and first-dimensional space information of the previous piece of event data, to obtain a sixth group of differences; converting, by using the preset first function, a negative number in second-dimensional information or first-dimensional information of the event data ranking first and the sixth group of differences into a positive number; and obtaining the sixth sequence based on converted second-dimensional information or first-dimensional information of the event data ranking first and each difference in a converted sixth group of differences.

With reference to the first possible implementation of the third aspect, in a fifth possible implementation of the data storage apparatus, when values of all elements in the sequence are the same and bit widths of all the elements are all b, the preset compression manner includes a first compression manner. In the first compression manner, the values of all the elements in the sequence are recorded by using a b-bit binary number. A value of b is recorded by using a B-bit binary number. Herein, both b and B are positive integers.

With reference to the first possible implementation of the third aspect, in a sixth possible implementation of the data storage apparatus, when a largest bit width of elements in the sequence is b, the preset compression manner includes a second compression manner. In the second compression manner, a value of each element in the sequence is recorded by using a b-bit binary number. A value of b is recorded by using a B-bit binary number. Herein, both b and B are positive integers.

With reference to the first possible implementation of the third aspect, in a seventh possible implementation of the data storage apparatus, when bit widths of at least two elements in the sequence are different, and a largest bit width of elements in the sequence is b, the preset compression manner includes a third compression manner. In the third compression manner, a less than b is set, values of b and a each are recorded by using a B-bit binary number, low-a-bit data in a binary form of each element in the sequence is recorded by using a binary number whose bit width is equal to a, high-(b-a)-bit data in the binary form of the element in the sequence is recorded by using a binary number whose bit width is equal to b-a, and whether each element includes high-(b-a)-bit data is recorded by using a binary number whose bit width is equal to a quantity of elements in the sequence. Herein, b, B, and a are all positive integers.

According to a fourth aspect, an embodiment of this disclosure provides a data reading apparatus. The apparatus is used in a processor. The apparatus includes: a second obtaining module, configured to obtain a plurality of metadata blocks from a second storage area, where the plurality of metadata blocks correspond to a plurality of data blocks, each data block includes a part of processed event data, and each metadata block includes a start time, an end time, a quantity, and a compression manner of event data in a data block corresponding to the metadata block, and a storage address of the data block; a first screening module, configured to find, in the plurality of metadata blocks, at least one metadata block that includes a start time and an end time between which any time point is in a target time interval; and a second processing module, configured to obtain, from a first storage area based on a storage address in the at least one found metadata block, at least one data block corresponding to the at least one found metadata block, and process the data block based on a compression manner in a found metadata block corresponding to each data block, to obtain to-be-read event data.

With reference to the fourth aspect, in a first possible implementation of the data reading apparatus, the processing the data block based on a compression manner in a found metadata block corresponding to each data block, to obtain to-be-read event data includes: performing decompression processing on the data block based on the compression manner in the found metadata block corresponding to each data block, to obtain a plurality of decompressed sequences, where the plurality of sequences include time information, space information, and event content information of event data in an event chunk corresponding to the data block, a quantity of elements in each sequence is equal to a quantity of pieces of event data in the event chunk, an element value in each sequence is an integer greater than or equal to 0, and a quantity of elements whose element values are greater than a first threshold is greater than a quantity of elements whose element values are less than or equal to the first threshold; processing the plurality of decompressed sequences obtained through decompression processing performed on each data block, to obtain the event chunk corresponding to each data block; and using, as the read event data, event data that is in event data included in all event chunks and whose time information is in the target time interval.

With reference to the first possible implementation of the fourth aspect, in a second possible implementation of the data reading apparatus, the plurality of sequences include a first sequence. The first sequence includes the time information of the event data in the event chunk. The processing the plurality of decompressed sequences obtained through decompression processing performed on each data block, to obtain the event chunk corresponding to each data block includes: for any first sequence, performing summation on each element in the first sequence and all elements before the element, to obtain a first group of sum values; and using a first element in the first sequence and all sum values in the first group of sum values respectively as the time information of the event data in the event chunk corresponding to the first sequence.

With reference to the second possible implementation of the fourth aspect, in a third possible implementation of the data reading apparatus, the plurality of sequences further include a second sequence, a third sequence, and a fourth sequence. The second sequence includes first-dimensional space information of the event data in the event chunk. The third sequence includes second-dimensional space information of the event data in the event chunk. The fourth sequence includes the event content information of the event data in the event chunk. The processing the plurality of decompressed sequences obtained through decompression processing performed on each data block, to obtain the event chunk corresponding to each data block further includes: for any second sequence, third sequence, or fourth sequence, converting each element in the second sequence, the third sequence, or the fourth sequence by using an inverse function of a preset first function, to obtain a converted element; performing summation on each converted element and all elements before the element, to obtain a second group of sum values, a third group of sum values, or a fourth group of sum values; and using a converted first element and each sum value in a converted second group of sum values as the first-dimensional space information of the event data in the event chunk corresponding to the second sequence, or using a converted first element and each sum value in a converted third group of sum values as the second-dimensional space information of the event data in the event chunk corresponding to the third sequence, or using a converted first element and each sum value in a converted fourth group of sum values as the event content information of the event data in the event chunk corresponding to the fourth sequence.

With reference to the second possible implementation of the fourth aspect, in a fourth possible implementation of the data reading apparatus, the plurality of sequences further include a fifth sequence and a sixth sequence. The fifth sequence and the sixth sequence include the space information of the event data in the event chunk. The fifth sequence further includes the event content information of the event data in the event chunk. The processing the plurality of decompressed sequences obtained through decompression processing performed on each data block, to obtain the event chunk corresponding to each data block further includes: for any fifth sequence, converting each element in the fifth sequence by using an inverse function of a preset first function, to obtain a converted element; performing summation on each converted element and all elements before the element, to obtain a fifth group of sum values; processing a converted first element and each sum value in the fifth group of sum values by using an inverse function of a preset second function, to obtain event content information of each piece of event data and first-dimensional space information or second-dimensional space information of the event data; for any sixth sequence, converting each element in the sixth sequence by using the inverse function of the preset first function, to obtain a converted element; performing summation on each converted element and all elements before the element, to obtain a sixth group of sum values; and using a converted first element and each sum value in a converted sixth group of sum values as second-dimensional space information or first-dimensional space information of the event data in the event chunk corresponding to the sixth sequence.

With reference to the first possible implementation of the fourth aspect, in a fifth possible implementation of the data reading apparatus, the data block includes a plurality of pieces of compressed data. The performing decompression processing on the data block based on the compression manner in the found metadata block corresponding to each data block, to obtain a plurality of decompressed sequences includes: when the compression manner corresponding to the metadata block indicates that a compression manner of any compressed data is a first compression manner, reading a B-bit binary number from the compressed data; determining a value of b based on a decimal form of the B-bit binary number, and further reading a b-bit binary number from the compressed data; and using a decimal form of the b-bit binary number as a value of each element in the sequence, to obtain a decompressed sequence, where both b and B are positive integers.

With reference to the first possible implementation of the fourth aspect, in a sixth possible implementation of the data reading apparatus, the data block includes a plurality of pieces of compressed data, and the performing decompression processing on the data block based on the compression manner in the found metadata block corresponding to each data block, to obtain a plurality of decompressed sequences includes: when the compression manner corresponding to the metadata block indicates that a compression manner of any compressed data is a second compression manner, reading a B-bit binary number from the compressed data; determining a value of b based on a decimal form of the B-bit binary number; further sequentially reading a b-bit binary number from the compressed data until a quantity of read b-bit binary numbers is equal to a quantity that is of pieces of event data and that is indicated by the metadata block; and using a decimal form of the sequentially read b-bit binary number as a value of each element in the sequence, to obtain a decompressed sequence, where both b and B are positive integers.

With reference to the first possible implementation of the fourth aspect, in a seventh possible implementation of the data reading apparatus, the data block includes a plurality of pieces of compressed data, and the performing decompression processing on the data block based on the compression manner in the found metadata block corresponding to each data block, to obtain a plurality of decompressed sequences includes: when the compression manner corresponding to the metadata block indicates that a compression manner of any compressed data is a third compression manner, sequentially reading two B-bit binary numbers from the compressed data; determining a value of b and a value of a respectively based on decimal forms of the two B-bit binary numbers; further sequentially reading an a-bit binary number from the compressed data until a quantity of read a-bit binary numbers is equal to a quantity that is of pieces of event data and that is indicated by the metadata block; using the sequentially read a-bit binary number as low a bits of each element in the sequence; further reading, from the compressed data, a binary number whose bit width is equal to the quantity that is of pieces of event data and that is indicated by the metadata block, and determining, based on each bit of the binary number, whether each element in the sequence includes high-(b-a)-bit data; further sequentially reading a (b-a)-bit binary number from the compressed data until a quantity of read (b-a)-bit binary numbers is equal to a quantity of determined elements that each include high-(b-a)-bit data; and using the read (b-a)-bit binary number as high b-a bits of an element that includes high-(b-a)-bit data in the sequence, where b, B, and a are all positive integers.

According to a fifth aspect, an embodiment of this disclosure provides a data storage apparatus, including a processor and a memory configured to store instructions executable by the processor, where the processor is configured to implement the data storage method according to the first aspect or one or more of the possible implementations of the first aspect when executing the instructions.

According to a sixth aspect, an embodiment of this disclosure provides a data reading apparatus, including a processor and a memory configured to store instructions executable by the processor, where the processor is configured to implement the data reading method according to the first aspect or one or more of the possible implementations of the first aspect when executing the instructions.

According to a seventh aspect, an embodiment of this disclosure provides a non-volatile computer-readable storage medium, where the non-volatile computer-readable storage medium stores computer program instructions. When the computer program instructions are executed by a processor, the data storage method according to the first aspect or one or more of the possible implementations of the first aspect is implemented, or the data reading method according to the second aspect or one or more of the possible implementations of the second aspect is implemented.

According to an eighth aspect, an embodiment of this disclosure provides a computer program product including computer-readable code or a non-volatile computer-readable storage medium carrying computer-readable code. When the computer-readable code runs on an electronic device, a processor in the electronic device performs the data storage method according to the first aspect or one or more of the possible implementations of the first aspect, or performs the data reading method according to the second aspect or one or more of the possible implementations of the second aspect.

These aspects and other aspects of this disclosure are more concise and more comprehensible in descriptions of the following (a plurality of) embodiments.

BRIEF DESCRIPTION OF DRAWINGS

The accompanying drawings included in this specification and constituting a part of this specification and this specification jointly show example embodiments, features, and aspects of this disclosure, and are intended to explain the principles of this disclosure.

DESCRIPTION OF EMBODIMENTS

The following describes various example embodiments, features, and aspects of this disclosure in detail with reference to the accompanying drawings. Identical reference signs in the accompanying drawings indicate elements that have same or similar functions. Although various aspects of embodiments are illustrated in the accompanying drawings, the accompanying drawings are not necessarily drawn in proportion unless otherwise specified.

The specific term "example" herein means "used as an example, embodiment or illustration". Any embodiment described as "exemplary" is not necessarily explained as being superior or better than other embodiments.

In addition, to better describe this disclosure, numerous specific details are given in the following specific implementations. A person skilled in the art should understand that this disclosure can also be implemented without some specific details. In some instances, methods, means, elements, and circuits that are well-known to a person skilled in the art are not described in detail, so that the subject matter of this disclosure is highlighted.

The following explains the terms in this specification.

An event camera is a new type of camera that can capture a light intensity change of each pixel in a scene and output a series of asynchronous event streams. There are mainly two types of event cameras: a dynamic vision sensor (DVS) and a dynamic and active pixel vision sensor (DAVIS). The dynamic vision sensor DVS is a common event camera that transmits only event data. The dynamic and active pixel vision sensor DAVIS can transmit both event data and grayscale or color images.

A color camera is a common camera that captures absolute light intensity of each pixel in a scene and outputs color images in frames.

A bit width is a quantity of bits required for representing an integer in binary. For example, 4 is represented by 100 in binary, and therefore a bit width is 3.

The following describes a manner in which the event camera generates an event.

Figures 1, 2A:
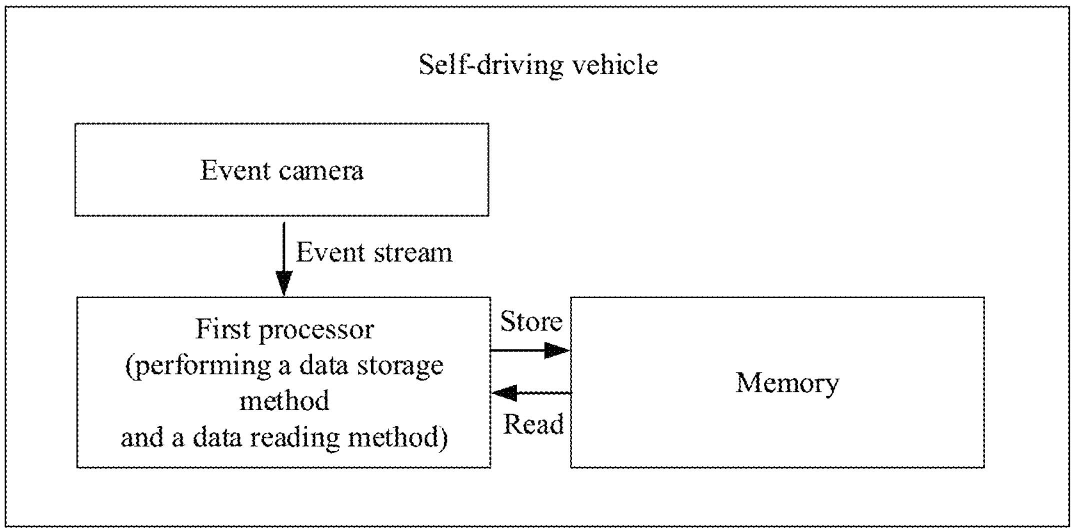
FIG. 1 shows an original form of some event data in the conventional technologies.
FIG. 2*a* shows an example application scenario of a data storage method and a data reading method according to an embodiment of this disclosure.

When an object or light in a real scene changes, an event sensor generates some pixel-level outputs (that is, events), and generates a spatial-temporal data stream including a series of events, that is, an event stream. An event specifically includes four parts: (t, x, y, p), where x and y are pixel coordinates of the event in two-dimensional space, t is a timestamp (unit: microsecond) of the event, and p is a polarity of the event (the polarity of the event indicates whether a pixel luminance change is an increase or a decrease). FIG. 1 shows an original form of some event data in the conventional technologies. Each row is an event. Four columns of data are t, x, y, and p. The event camera captures only dynamic changes in a scene. A static background and redundant information are not recorded. Therefore, compared with the conventional color camera, the event camera has characteristics of a large dynamic range and a low delay and is widely concerned by people. Application of the event camera is important in fields such as image reconstruction, target tracking, gesture recognition, and eye tracking in a high dynamic range.

A form of output data of the event camera is an asynchronous event stream, that is, a series of pieces of (t, x, y, p) data. If a width of a pixel area of the event camera is W and a height of the pixel area is H, a range of pixel coordinates (x, y) may be $0 \le x \le W-1$, and $0 \le y \le H-1$. It is assumed that x data is stored by using $B_W$ bits, y data is stored by using $B_H$ bits, p is stored by using 1 bit (that is, 0 or 1 is used to indicate whether a luminance change is a decrease or an increase), and t is stored by using $B_t$ bits. In this case, a series of pieces of event data $$\{(t_i, x_i, y_i, p_i)\}_{i=1}^N$$

need $N^*(B_W+B_H+B_t+1)$ bits in total, where N represents a total quantity of pieces of event data.

However, the event camera has a relatively high time resolution (usually reaching a microsecond level). This also means that a maximum of one million events can be output at each pixel per second. Therefore, a volume of event data generated by the event camera is very large. It is inconvenient to store, transmit, read, and subsequently process the event data. In addition, because it is difficult to predict a spatial location of the event data, and the data is irregular, it is difficult to store the event data.

To reduce storage space occupied for storing the event data and facilitate subsequent transmission, processing, and reading, the conventional technologies provide some event data storage solutions. The following separately describes two common event data storage solutions.

A first conventional technology provides compression for timestamps. For example, for a group of events, 28 bits are used to store same high-bit data of timestamps of the group of events. For each event, 6 bits are used to store low-bit data of a timestamp of the event, and 22 bits are used to store pixel coordinates and a polarity of the event in two-dimensional space. If 32 bits are used as a storage unit, 28-bit high-bit data is set to a type 1, and 6-bit low-bit data and 22 bits for pixel coordinates in two-dimensional space and a polarity are set to a type 2, for a group of events, type information (the type 1 or the type 2) may be stored by using 4 bits; and high-bit data of timestamps may be stored by using 28 bits (the type 1), or low-bit data (6 bits) of a timestamp, and pixel coordinates in two-dimensional space and a polarity (22 bits) may be stored by using 28 bits in total (the type 2). In this storage solution, one piece of type 1 data may be stored and some pieces of type 2 data may be added, to record event data in a small continuous period of time, thereby achieving compression effect.

In the first conventional technology, the timestamp is simply compressed mainly by using temporal redundancy of the event data. Compression performance is limited because space redundancy of the event data is not fully used. In addition, after data is stored based on this solution, the data can be only sequentially read and decompressed as a whole, and selective reading and on-demand decompression cannot be implemented, causing low reading efficiency.

A second conventional technology provides compressing event data with close timestamps and pixel coordinates in two-dimensional space in the same row. For example, common t, p, and y data and data of minimum x are recorded, and then 12 bits are used to record whether event data exists at 12 pixels x, x+1, . . . , and x+11, to achieve effect of compressing the common t, p, and y data.

In the second conventional technology, the data is simply compressed mainly by using temporal and spatial continuity of the data. This solution has good compression effect only when a plurality of continuous events exist at pixel coordinates of the same row of the two-dimensional space. Therefore, compression performance is limited. In addition, after data is stored based on this solution, the data can be only sequentially read and decompressed as a whole, and selective reading and on-demand decompression cannot be implemented, causing low reading efficiency.

In conclusion, in the conventional technologies, when data is read based on a common compression algorithm, the data needs to be decompressed as a whole and then a data read operation is performed on the data. However, during data compression, data of several minutes, even several hours, or several days is usually compressed together, and data of only dozens of milliseconds may need to be read in each time of reading, causing high data reading costs and low data reading efficiency. Therefore, a data storage solution is urgently needed, so that when the data is read, the data can be read without decompressing the data as a whole, thereby improving data reading efficiency.

To resolve the foregoing technical problems, this disclosure provides a data storage method, a reading method, an apparatus, a storage medium, and a program product. According to the data storage method in embodiments of this disclosure, when event data is read, the event data that needs to be read can be read without decompressing all data blocks, so that selective data reading can be supported, thereby improving data reading efficiency.

Figure 2B:
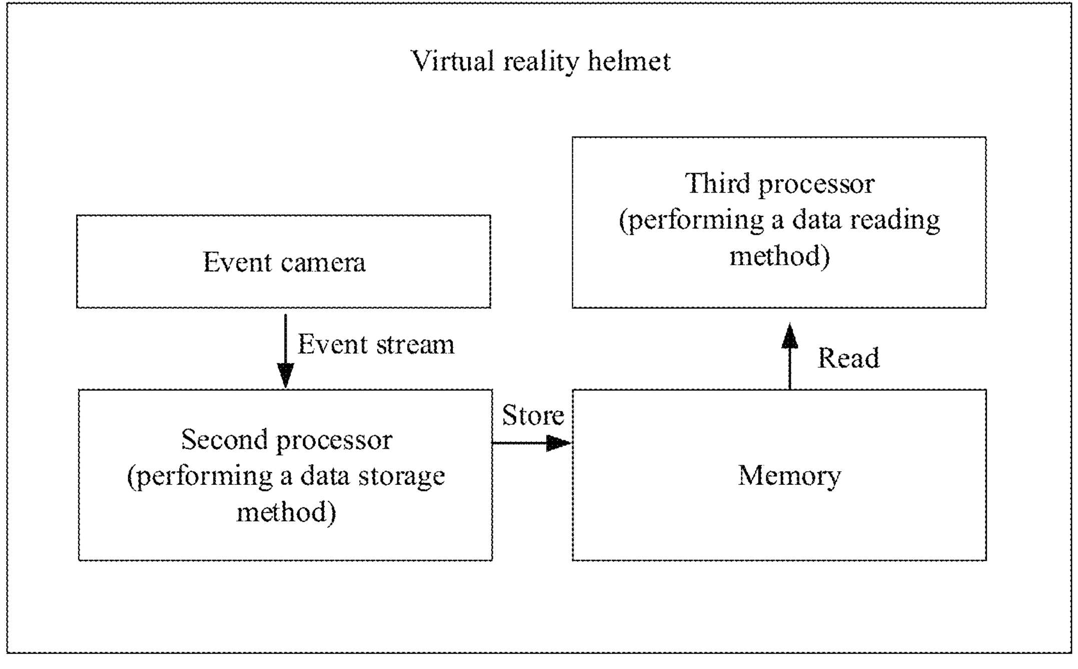
FIG. 2*b* shows an example application scenario of a data storage method and a data reading method according to an embodiment of this disclosure.

FIG. 2a and FIG. 2b each show an example application scenario of a data storage method and a data reading method according to an embodiment of this disclosure.

For example, the data storage method and the data reading method in this embodiment of this disclosure may be performed by a processor. A processor for performing the data storage method and a processor for performing the data reading method may be the same or different, and may be disposed on the same terminal device or may be disposed on different terminal devices. This is not limited in this disclosure. The terminal device in this disclosure may be a smartphone, a netbook, a tablet computer, a notebook computer, a wearable electronic device (such as a smart band or a smart watch), a TV, a virtual reality device, an acoustic device, an electronic ink, or the like. An apparatus or a module that can obtain event data, for example, an event camera (for example, a dynamic vision sensor DAS or a dynamic and active pixel vision sensor DAVIS described above), may be further disposed on the terminal device that includes the processor for executing the data storage method. The event camera may generate streaming data including a series of pieces of event data (referring to the foregoing example and the example in FIG. 1). In this case, the event data may include time information (corresponding to x above), space information (corresponding to x and y above), and event content information (corresponding to p above).

For example, in the example in FIG. 2a, the data storage method and the data reading method in this embodiment of this disclosure may be performed by a first processor, and the first processor may be disposed on a self-driving vehicle with an event camera. In this case, the event data output by the event camera may be driving data of the vehicle, and is related to brightness changes of a field of view in several directions in a driving process of the vehicle. The first processor performs the data storage method in this embodiment of this disclosure, to implement lossless compression and storage of the event data, for example, store the event data in a memory. After the data reading method is performed, needed event data can be quickly read, so that the vehicle responds to the brightness changes of the field of view in the several directions in the driving process.

For another example, in the example in FIG. 2b, the data storage method in this embodiment of this disclosure may be performed by a second processor, and the second processor may be disposed on a virtual reality helmet with an event camera. In this case, an event stream output by the event camera may be eye movement information of a user, and the information may be related to a brightness change of a field of view of the user in a virtual reality scenario provided by the virtual reality helmet. The second processor performs the data storage method in this embodiment of this disclosure, to implement lossless compression and storage of the event data, for example, store the event data in a memory. The data reading method may be performed by a third processor, and the third processor may also be disposed on a virtual reality helmet with an event camera. After the data reading method is performed, needed event data can be quickly read, so that the virtual reality helmet responds to a brightness change of a field of view of the user in a virtual reality scenario.

A person skilled in the art should understand that the event data in this embodiment of this disclosure may be alternatively generated by another apparatus or module. For example, the event data may be radar observation data (t, x, y, d) generated by a radar, and indicates a radar echo event at a moment t (time information) and longitude and latitude xy (space information), where specific data content of the echo is d (event content information). For another example, the event data may alternatively be observation data (t, x, y, d') generated by a planar observation array used in physical observation, and indicates an observation value d' (event content information) of a voltage, a current, a response, or the like at a moment t (time information) at an array location xy (space information). A source of the event data is not limited in this disclosure. For clear description, an example in which the event data comes from the event camera is used below.

The data storage method and the data reading method in embodiments of this disclosure may be further applied to more application scenarios, provided that the application scenarios are related to storage and/or reading of event data. This is not limited in this disclosure.

Figure 3:
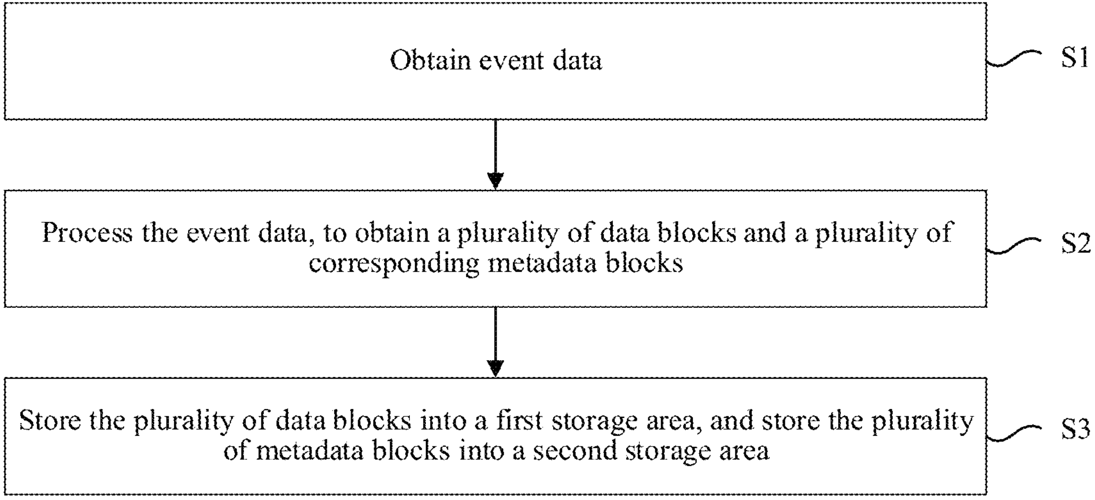
FIG. 3 is a flowchart of a data storage method according to an embodiment of this disclosure.
Figure 4:
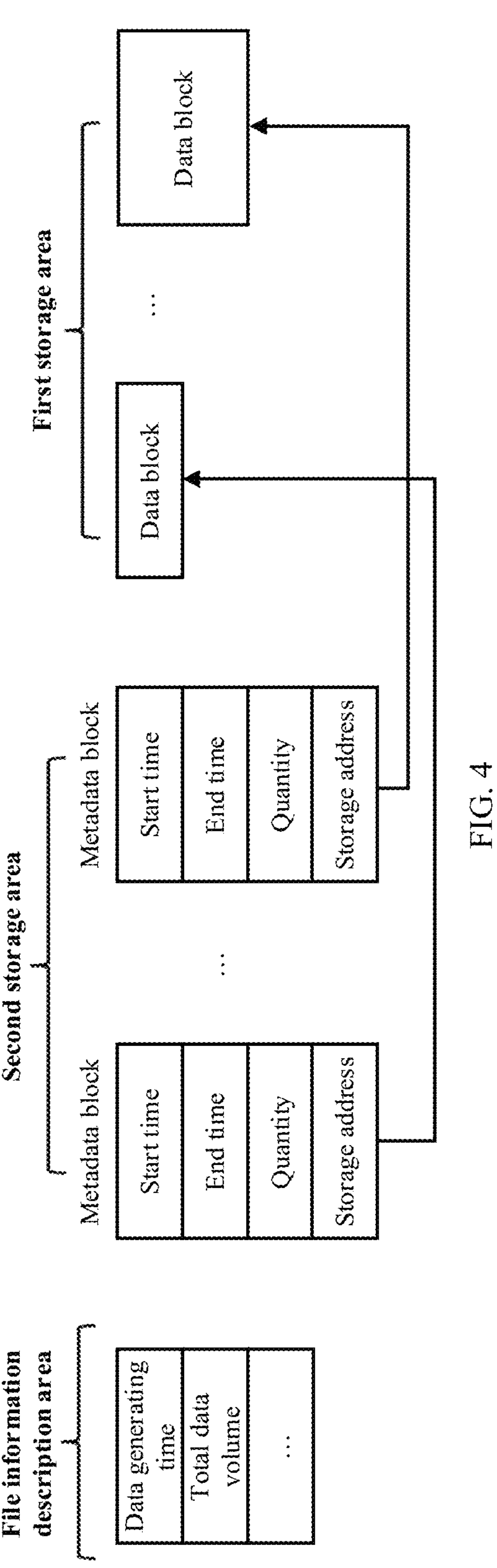
FIG. 4 shows an example of a first storage area and a second storage area according to an embodiment of this disclosure.
Figure 5:
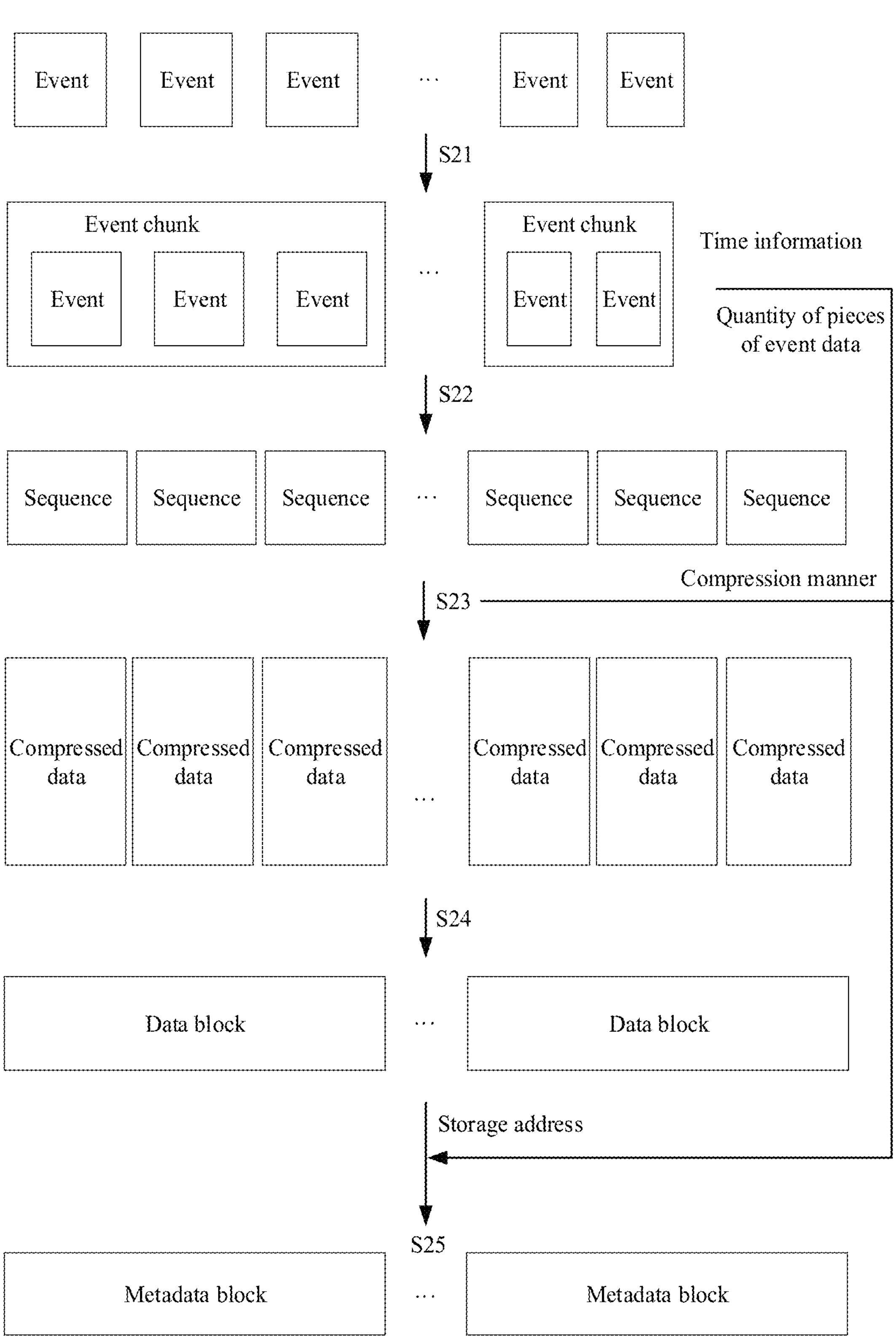
FIG. 5 is a diagram of a method for processing event data to obtain a plurality of data blocks and a plurality of corresponding metadata blocks according to an embodiment of this disclosure.
Figure 6:
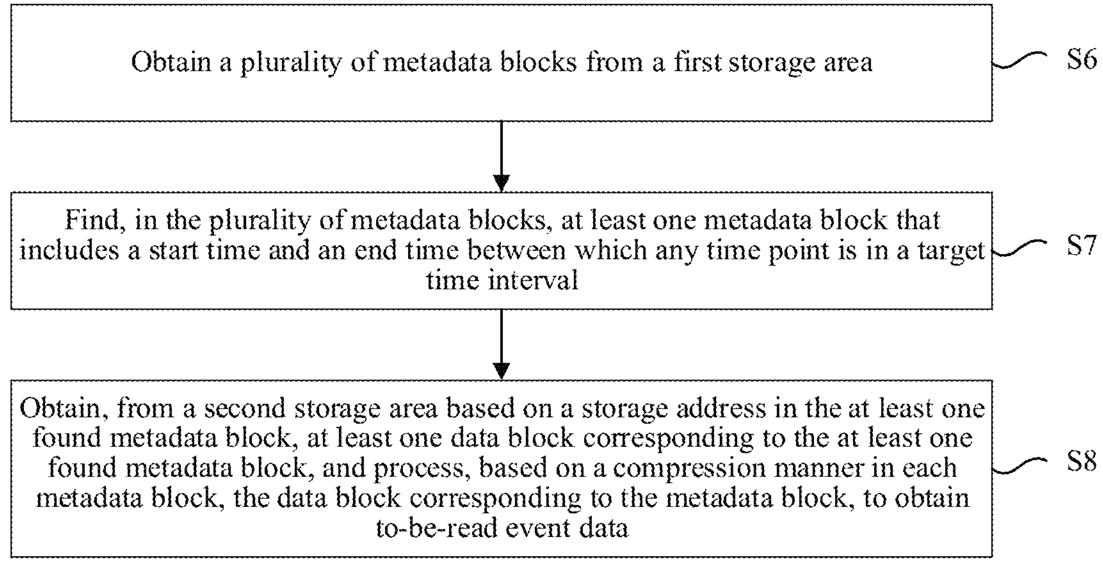
FIG. 6 is a flowchart of a data reading method according to an embodiment of this disclosure.
Figure 7:
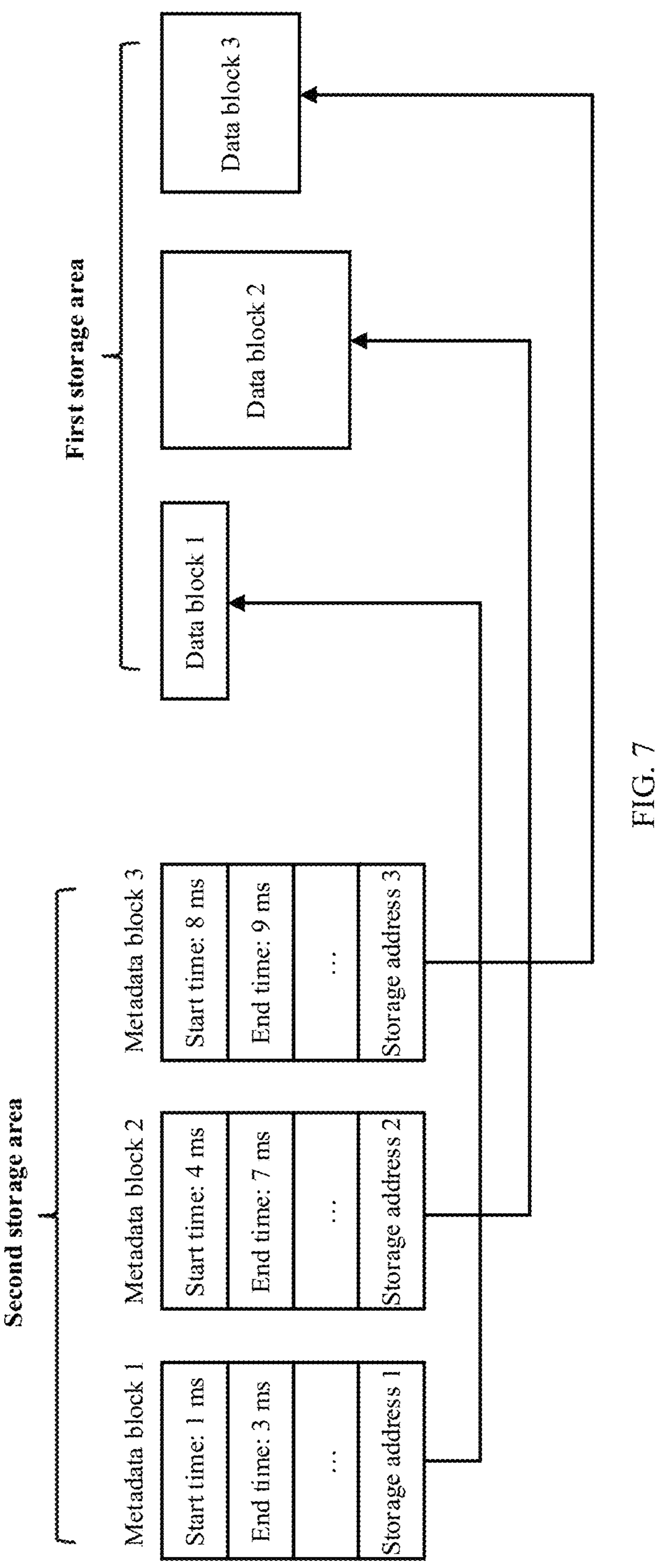
FIG. 7 shows an example of metadata blocks and data blocks that are stored according to an embodiment of this disclosure.
Figure 8:
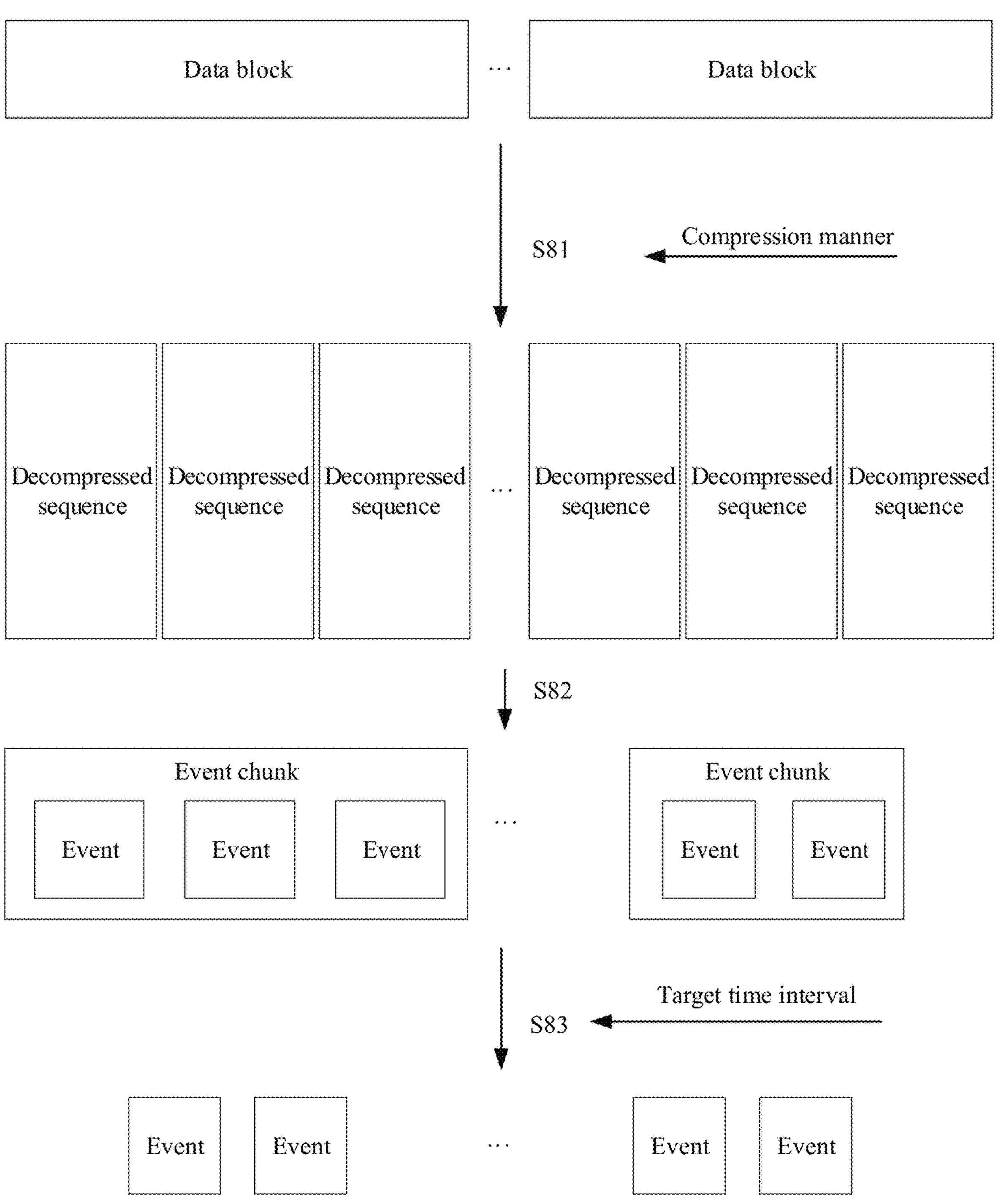
FIG. 8 is a diagram of a method for processing an obtained corresponding data block to obtain to-be-read event data according to an embodiment of this disclosure.

The following first describes the data storage method in embodiments of this disclosure with reference to FIG. 3 to FIG. 5, and then describes the data reading method in embodiments of this disclosure with reference to FIG. 6 to FIG. 8.

FIG. 3 is a flowchart of a data storage method according to an embodiment of this disclosure.

As shown in FIG. 3, in a possible implementation, this disclosure provides a data storage method. The method is applied to a processor. The method includes steps S1 to S3.

Step S1: Obtain event data. For example, the event data may be output by an event camera, and the event data may include time information (corresponding to x above), space information (corresponding to x and y above), and event content information (corresponding to p above). For an example of the event data, refer to the foregoing descriptions and related descriptions of FIG. 1. Details are not described herein again.

Step S2: Process the event data, to obtain a plurality of data blocks and a plurality of corresponding metadata blocks, where each data block includes a part of processed event data, and each metadata block includes a start time, an end time, a quantity, and a compression manner of event data in a data block corresponding to the metadata block, and a storage address of the data block.

When the event data is processed, a same data block may be obtained by processing event data with a specific association relationship. For example, if a polarity of an event at pixel coordinates in two-dimensional space is 1, it is very possible that a polarity of an event generated in a specific area around the event at the pixel coordinates is also 1 in a specific time. Therefore, the event at the pixel coordinates and the event in the specific area around the event at the pixel coordinates in the specific time may be used for processing to obtain the same data block. It can be learned from the foregoing description that the event data includes a timestamp (also referred to as time information below). Therefore, the start time of the event data in the data block corresponding to the metadata block may be an earliest timestamp (time information) of all the event data, and the end time of the event data in the data block corresponding to the metadata block may be a latest timestamp (time information) of all the event data. The compression manner of the event data in the data block corresponding to the metadata block may be a first compression manner, a second compression manner, a third compression manner, or the like described below. For a specific implementation of step S2, refer to the following descriptions and related descriptions of FIG. 5.

Step S3: Store the plurality of data blocks into a first storage area, and store the plurality of metadata blocks into a second storage area.

The first storage area and the second storage area may be different storage areas on the processor, or may be different storage areas on a same memory electrically connected to the processor, or may be separately located on two memories electrically connected to the processor. Provided that stored data can be obtained from the first storage area (or the second storage area) without being affected by the second storage area (or the first storage area), a specific setting manner of the first storage area and the second storage area is not limited in this disclosure. FIG. 4 shows an example of a first storage area and a second storage area according to an embodiment of this disclosure. A file information description area may be used to record some overall information and additional information of data stored in the first storage area and the second storage area, for example, a data source device, a data generating time (that is, time information of event data), and a total data volume.

According to the data storage method in this embodiment of this disclosure, the event data is obtained, and the event data is processed, to obtain the plurality of data blocks and the plurality of corresponding metadata blocks. Each data block includes the part of processed event data, so that block compression can be performed on the event data. Each metadata block includes the start time, the end time, the quantity, and the compression manner of the event data in the data block corresponding to the metadata block, and the storage address of the data block, so that the metadata block can indicate event data information in the data block corresponding to the metadata block. The plurality of data blocks are stored in the first storage area, and the plurality of metadata blocks are stored in the second storage area. In this partitioned storage manner, the metadata block and the data block can be separately read. In this way, when the event data is read, a data block that meets a requirement can be found based on a time interval of event data that needs to be read, that is, based on time information included in a metadata block. In other words, a query of the time interval is supported. The event data that needs to be read can be obtained by correspondingly decompressing the data block based on a compression manner of the data block that meets the requirement. On-demand reading can be supported without decompressing all the data blocks. Only related data needs to be read, and not all data needs to be read. Therefore, according to the data storage method in this embodiment of this disclosure, when the event data is read, the event data that needs to be read can be read without decompressing all the data blocks, thereby supporting selective data reading and improving data reading efficiency.

FIG. 5 is a diagram of a method for processing event data to obtain a plurality of data blocks and a plurality of corresponding metadata blocks according to an embodiment of this disclosure.

As shown in FIG. 5, in a possible implementation, step S2 includes steps S21 to S25.

Step S21: Perform chunking on the event data based on time information and/or space information in the event data, to obtain a plurality of event chunks.

For example, in step S21, chunking may be performed on the event data based on the time information and/or the space information in the event data. The entire event data $$\{(t_i, x_i, y_i, p_i)\}_{i=1}^{N}$$

is divided into segments. Each segment of the event data is referred to as an event chunk (event chunk). Table 1 is a diagram of an event chunk according to an embodiment of this disclosure.

TABLE 1

| i | $t_i$ | Binary representation of $t_i$ | $x_i$ | Binary representation of $x_i$ | $y_i$ | Binary representation of $y_i$ | $p_i$ |
|---|---|---|---|---|---|---|---|
| 1 | 1652518200000000 | 00000000<br>00000101<br>11011110<br>11110100<br>11100000<br>01001011<br>10111110<br>00000000 | 129 | 00000000<br>10000001 | 129 | 00000000<br>10000001 | 1 |
| 2 | 1652518200000001 | 00000000<br>00000101<br>11011110<br>11110100<br>11100000<br>01001011<br>10111110<br>00000001 | 129 | 00000000<br>10000001 | 130 | 00000000<br>10000010 | 1 |
| 3 | 1652518200000002 | 00000000<br>00000101<br>11011110<br>11110100<br>11100000<br>01001011<br>10111110<br>00000010 | 130 | 00000000<br>10000010 | 129 | 00000000<br>10000001 | 1 |
| 4 | 1652518200000003 | 00000000<br>00000101<br>11011110<br>11110100<br>11100000<br>01001011<br>10111110<br>00000011 | 130 | 00000000<br>10000010 | 130 | 00000000<br>10000010 | 1 |

With reference to Table 1, the event chunk includes four pieces of event data: event data 1 {t1, x1, y1, p1}, event data 2 {t2, x2, y2, p2}, event data 3 {t3, x3, y3, p3}, and event data 4 {t4, x4, y4, p4}, respectively. The event data 1 is used as an example. In this example, $t_1$ may represent time information (that is, a timestamp in the conventional technologies) of the event data, has a value of 1652518200000000, is in a unit of microsecond, and is stored by using 64 bits; $x_1$ and $y_1$ may respectively represent first-dimensional space information and second-dimensional space information (that is, pixel coordinates in two-dimensional space in the conventional technologies) of the event data, both have values of 129, and both are stored by using 16 bits; and $p_1$ may represent event content information (that is, a polarity in the conventional technologies) of the event data, has a value of 1, and is stored by using 1 bit.

That chunking is performed on the event data based on the time information in the event data may be that a plurality of pieces of event data in a preset time interval are allocated to one event chunk. For example, when the preset time interval is 1652518199999999-1652518200000004, time information of the event data 1, 2, 3, and 4 all meets the preset time interval, and the event data 1, 2, 3, and 4 may be allocated to the same event chunk.

That chunking is performed on the event data based on the space information in the time data may be that a plurality of pieces of event data in a preset pixel area are allocated to one event chunk. For example, when the preset pixel area is an area of 128≤x≤129 and 128≤y≤130, space information of the event data 1 and that of the event data 2 in Table 1 are both in the preset pixel area, and may be allocated to the same event chunk.

That chunking is performed on the event data based on the time information in the event data may be that a plurality of pieces of event data in a preset pixel area in a preset time interval are allocated to the same event chunk. For example, when the preset time interval is 1652518200000000-1652518200000002, and the preset pixel area is an area of 128≤x≤130 and 128≤y≤130, time information of the event data 1, 2, and 3 meets the preset time interval, space information of the event data 1, 2, and 3 is in the preset pixel area, and the event data 1, 2, and 3 may be allocated to the same event chunk.

It may be understood that a chunking manner of the event data should be not limited to the foregoing example. For example, the preset time interval and the preset pixel area may be larger or smaller, and a corresponding event chunking rule may be further set based on another condition such as an event quantity. A specific chunking manner of the event data is not limited in this disclosure.

For clear description, in the following, for example, the event data 1, the event data 2, the event data 3, and the event data 4 are allocated to the same event chunk 1, and the event chunk 1 includes only the four pieces of event data.

Step S22: Process each event chunk, to obtain a plurality of sequences. The plurality of sequences include time information, space information, and event content information of event data in the event chunk. A quantity of elements in each sequence is equal to a quantity of pieces of event data in the event chunk. An element value in each sequence is an integer greater than or equal to 0. A quantity of elements whose element values are greater than a first threshold is greater than a quantity of elements whose element values are less than or equal to the first threshold.

For example, in step S2, each event chunk may be processed to obtain the plurality of sequences. For example, for the event chunk 1, time information, space information, and event content information of the event data 1, 2, 3, and 4 in the event chunk 1 may be separately processed to obtain a sequence including the time information, a sequence including the space information, and a sequence including the event content information. Alternatively, one sequence may include two or more types of information, for example, may include the space information and the event content information. The quantity of elements in each sequence is equal to the quantity of pieces of event data in the event chunk. For example, when the quantity of pieces of event data in the event chunk 1 is 4, the quantity of elements in the sequence obtained through processing is also 4. After the processing, the element value in each sequence may be an integer greater than or equal to 0, and the quantity of elements whose element values are greater than a first threshold is greater than the quantity of elements whose element values are less than or equal to the first threshold. For an example manner of processing the event chunk to obtain the plurality of sequences and examples of the sequences obtained through processing, refer to related descriptions of processing the event chunk 1 to obtain a first sequence, a fifth sequence, and a sixth sequence below. The first threshold may be preset according to an actual scenario requirement. Selection of a value of the first threshold is not limited in this disclosure.

Step S23: For each sequence, select, from a preset compression manner, a compression manner matching the sequence, and compress the sequence based on the selected compression manner, to obtain compressed data.

The preset compression manner may be a first compression manner, a second compression manner, a third compression manner, or the like described below. The compression manner that is selected for each sequence and that matches the sequence may be a preset compression manner in which an element in the sequence meets a compression requirement and occupies a smallest quantity of bits after compression in various preset compression manners. It should be noted that, in step S23, the corresponding compression manner is selected for the sequence for compression. Therefore, for a plurality of sequences obtained based on the same event chunk, different compression manners may be separately used for compression. For an example of the compressed data, refer to related descriptions of the first compression manner, the second compression manner, and the third compression manner below.

Step S24: Obtain one data block based on a plurality of pieces of compressed data obtained based on the plurality of sequences corresponding to each event chunk.

In this case, each data block is equivalent to a result of compressing each event chunk. All event data may be compressed to a plurality of data blocks.

Step S25: Obtain, based on time information in event data included in each event chunk, a quantity of pieces of event data, a selected compression manner, and a storage address of the data block, one metadata block corresponding to the data block.

For example, based on the time information of the event data 1, 2, 3, and 4 included in the event chunk 1, it may be determined that the event data 1 has an earliest piece of time information in the time information of the pieces of event data, that is, 1652518200000000, and the event data 4 has a latest piece of time information in the time information of the pieces of event data, that is, 1652518200000003. In this case, a start time in a metadata block may be recorded as 1652518200000000, and an end time may be recorded as 1652518200000003. Based on the event data 1, 2, 3, and 4 included in the event chunk 1, it may be determined that the quantity of pieces of event data in the event chunk 1 is 4, so that a quantity in the metadata block can be recorded as 4. A compression manner in the metadata block may be recorded based on a compression manner of each sequence in the event chunk 1. For example, when there are four sequences and compression manners are respectively the second compression manner, the third compression manner, the third compression manner, and the second compression manner, the compression manner in the metadata block may be recorded as the second compression manner, the third compression manner, the third compression manner, and the second compression manner. An order of information included in the sequence may be preset, and should be consistent with an order of compression manners recorded in the metadata block. In this way, a correct compression manner of the data block can be determined during data reading, and decompression can be performed in a decompression manner corresponding to the compression manner.

The storage address of the data block may be first determined, and the storage address of the data block is recorded in the metadata block. Then, step S3 is performed to store the data block and the metadata block. Alternatively, after the storage address of the data block is determined, the data block may be first stored, and then the storage address of the data block is recorded in the metadata block and the metadata block is stored. A person skilled in the art should understand that an order of the step of recording the storage address of the data block in the metadata block and the step of storing the data block is not limited in this disclosure, provided that the step of recording the storage address of the data block in the metadata block and the step of storing the data block are both completed after the step of determining the storage address of the data block, and the step of storing the metadata block is completed after the step of recording the storage address of the data block in the metadata block.

In this manner, the original redundant event data may be converted into a form in which a large part of data values are small and a small part of data values are large and that is easy for compression. In this way, data storage costs can be reduced during compression.

The following describes an example method for obtaining the plurality of sequences through processing according to an embodiment of this disclosure.

In a possible implementation, this embodiment of this disclosure proposes to preprocess data $$\{(t_i, x_i, y_i, p_i)\}_{i=1}^{m}$$

in an event chunk to obtain four sequences by using spatial-temporal redundancy of the data: a first sequence $$\{(\tilde{t}_t)\}_{i=1}^{m},$$

a second sequence $$\{(\tilde{x}_i)\}_{i=1}^{m},$$

a third sequence $$\{(\tilde{y}_i)\}_{i=1}^{m},$$

and a fourth sequence $$\{(\tilde{p}_i)\}_{i=1}^{m},$$

where m represents a quantity of pieces of event data in the event chunk. In this way, all the four sequences have the following features: An element value in each sequence is an integer greater than or equal to 0, and a quantity of elements whose element values are greater than a first threshold is greater than a quantity of elements whose element values are less than or equal to the first threshold.

The following describes an example method for obtaining the first sequence through processing according to an embodiment of this disclosure.

In a possible implementation, the plurality of sequences include the first sequence, and the first sequence includes the time information of the event data in the event chunk. Step S22 includes:

- sorting the event data in the event chunk based on a time information order, and performing subtraction between time information of each piece of event data and time information of a previous piece of event data, to obtain a first group of differences; and
- using time information of event data ranking first and all differences in the first group of differences respectively as elements in the first sequence, to obtain the first sequence.

For example, because a time resolution of an event generated by an event camera reaches a microsecond level, a difference of the time information of the event data is also at a microsecond level. For example, if the event chunk 1 includes the event data 1 to the event data 4, the event data is sorted based on the time information order. The order may be the event data 1—the event data 2—the event data 3—the event data 4. If the time information of the event data is separately taken out according to the order to obtain a sequence $$\{(t_i)\}_{i=1}^{m},$$

it can be found that the sequence is monotonically non-decreasing, a value of each element may be relatively large, and a difference between two adjacent elements is very small. For example, a sequence $$\{(t_i)\}_{i=1}^{m} = \{1652518200000000, 165218200000001, 1652518200000002, 1652518200000003$$

may be obtained for the event chunk 1, and a difference between two adjacent elements in the sequence is 1.

Based on features of the sequence $$\{(t_i)\}_{i=1}^{m},$$

this disclosure proposes to perform subtraction between time information of each piece of event data and time information of a previous piece of event data (for example, calculate a first-order difference of the sequence $$\{(t_i)\}_{i=1}^{m}$$

by using a delta function in the conventional technologies), to obtain a first group of differences $t_2-t_1, \ldots,$ and $t_m-t_{m-1}$, and use time information $t_1$ of event data ranking first and all differences in the first group of differences $t_2-t_1, \ldots,$ and $t_m-t_{m-1}$ respectively as elements in a first sequence, to obtain the first sequence $t_1, t_2-t_1, \ldots,$ and $t_m-t_{m-1}$. The event chunk 1 is used as an example. The first group of differences is 1, 1, and 1. The first sequence is 1652518200000000, 1, 1, and 1. After this operation, only a first number in the first sequence is relatively large, and other numbers are relatively small positive numbers. A quantity of occupied bits during compression is greatly reduced.

In this manner, storage efficiency of the event data can be improved, and a capacity requirement for the first storage area can be lowered.

The following describes an example method for obtaining the second sequence, the third sequence, and the fourth sequence through processing according to an embodiment of this disclosure.

In a possible implementation, the plurality of sequences further include the second sequence, the third sequence, and the fourth sequence. The second sequence includes first-dimensional space information of the event data in the event chunk. The third sequence includes second-dimensional space information of the event data in the event chunk. The fourth sequence includes the event content information of the event data in the event chunk.

Step S22 further includes:

- performing subtraction between first-dimensional space information of each piece of event data and first-dimensional space information of the previous piece of event data, to obtain a second group of differences;
- converting, by using a preset first function, a negative number in first-dimensional space information of the event data ranking first and the second group of differences into a positive number;
- obtaining the second sequence based on converted first-dimensional space information of the event data ranking first and each difference in a converted second group of differences;
- performing subtraction between second-dimensional space information of each piece of event data and second-dimensional space information of the previous piece of event data, to obtain a third group of differences;

converting, by using the preset first function, a negative number in second-dimensional space information of the event data ranking first and the third group of differences into a positive number;

obtaining the third sequence based on converted second-dimensional space information of the event data ranking first and each difference in a converted third group of differences;

performing subtraction between event content information of each piece of event data and event content information of the previous piece of event data, to obtain a fourth group of differences;

converting, by using the preset first function, a negative number in event content information of the event data ranking first and the fourth group of differences into a positive number; and obtaining the fourth sequence based on converted event content information of the event data ranking first and each difference in a converted fourth group of differences.

For example, due to a sensing principle of an event camera, when an object moves or ambient light changes, a large area corresponding to the object or an entire background simultaneously becomes brighter or darker. Therefore, there is a relatively high probability that space information and event content information (x, y, p) of event data with close time information are relatively close. In other words, space redundancy exists in the event data. If the first-dimensional space information (x) of the event data in the event chunk is independently taken out to obtain a sequence $$\{(x_i)\}_{i=1}^{m},$$

and the second-dimensional space information (y) of the event data in the event chunk is independently taken out to obtain a sequence $$\{(y_i)\}_{i=1}^{m},$$

it can be learned that in the sequence $$\{(x_i)\}_{i=1}^{m}$$

and the sequence $$\{(y_i)\}_{i=1}^{m},$$

a value of each element may be relatively large, but a difference between two adjacent elements is very small. For example, for the event chunk 1, a sequence $$\{(x_i)\}_{i=1}^{m} = \{129, 129, 130, 130\}$$

may be obtained by separately taking out the first-dimensional space information (x), and a difference between two adjacent elements is 1 or 0; and a sequence $$\{(y_i)\}_{i=1}^{m} = \{129, 130, 129, 130\}$$

may be obtained by separately taking out the second-dimensional space information (y), and a difference between two adjacent elements is 1 or −1. Because the difference may be a negative number, and storage of the negative number usually needs to use a two's complement, a needed data volume is relatively large. Therefore, the space information cannot be compressed by directly using the difference.

Based on features of the sequence $$\{(x_i)\}_{i=1}^{m},$$

this disclosure proposes to perform subtraction between first-dimensional space information of each piece of event data and first-dimensional space information of a previous piece of event data (for example, calculate a first-order difference of the sequence $$(x_i)\}_{i=1}^{m}$$

by using a delta function in the conventional technologies), to obtain a second group of differences $x_2-x_1$, . . . , and $x_m-x_{m-1}$. The event chunk 1 is used as an example. The second group of differences are 0, 1, and 0. Then, the preset first function (for example, a zigzag function in the conventional technologies) is used to convert the negative number in the first-dimensional space information of the event data ranking first and the second group of differences into the positive number. The event chunk 1 is used as an example. The first-dimensional space information of the event data ranking first may be 129. The to-be-converted data may be {129, 0, 1, 0}. It is assumed that the zigzag function $$f(n) = \begin{cases} 2n, & n \geq 0 \\ -2n-1, & n < 0 \end{cases}$$

is used. In this case, {258, 0, 2, 0} may be obtained through conversion. Finally, the second sequence $$\{(\bar{x}_i)\}_{i=1}^{m}$$

is obtained based on the converted first-dimensional space information of the event data ranking first and each difference in the converted second group of differences. The event chunk 1 is used as an example. The converted first-dimensional space information of the event data ranking first is 258. All the differences in the converted second group of differences respectively 0, 2, and 0. In this case, the obtained second sequence $$\{(\tilde{x}_i)\}_{i=1}^{m}$$

may be {258, 0, 2, 0}.

The third sequence $$\{(\tilde{y}_i)\}_{i=1}^{m} = \{258, 2, 1, 0\}$$

may be obtained by replacing the first-dimensional space information with the second-dimensional space information. This is similar to a manner of obtaining the second sequence $$\{(\tilde{x}_i)\}_{i=1}^{m}.$$

The fourth sequence $$\{(\tilde{p}_i)\}_{i=1}^{m} = \{1, 1, 1, 1\}$$

can be obtained by replacing the first-dimensional space information with the event content information.

Further, when the event data is generated by the event camera, and the event content information indicates a polarity of the event data, because the polarity of the event data is usually 0 or 1, in this case, the event content information of the event data in the event chunk may also be directly used as an element in the fourth sequence. The event chunk 1 is used as an example. A sequence $$\{(p_i)\}_{i=1}^{m} = \{1, 1, 1, 1\}$$

may be obtained by separately taking out the event content information (p), and only occupies 4 bits. Therefore, the sequence $$\{(p_i)\}_{i=1}^{m}$$

may be directly used as the fourth sequence for compression. In other words, the fourth sequence $$\{(\tilde{p}_i)\}_{i=1}^{m} = \{1, 1, 1, 1\}$$

is obtained based on event content information of each piece of event data.

In this manner, the plurality of sequences obtained by processing the event chunk can indicate information about event data with a larger data volume in the event chunk by using a smaller data volume, thereby reducing a data redundancy degree.

The following describes another example method for obtaining the plurality of sequences through processing according to an embodiment of this disclosure.

In a possible implementation, this embodiment of this disclosure proposes to preprocess data $$\{(t_i, x_i, y_i, p_i)\}_{i=1}^{m}$$

in an event chunk to obtain three sequences by using spatial-temporal redundancy of the data: a first sequence $$\{(\tilde{t}_i)\}_{i=1}^{m},$$

a fifth sequence $$\{(\widetilde{py}_i)\}_{i=1}^{m} \text{ (or } \{(\widetilde{px}_i)\}_{i=1}^{m}\text{)},$$

and a sixth sequence $$\{(\tilde{x}_i)\}_{i=1}^{m} \text{ (or } \{(\tilde{y}_i)\}_{i=1}^{m}\text{)}.$$

Herein, m represents a quantity of pieces of event data in the event chunk. In this way, all the three sequences have the following features: An element value in each sequence is an integer greater than or equal to 0, and a quantity of elements whose element values are greater than a first threshold is greater than a quantity of elements whose element values are less than or equal to the first threshold.

For a manner of obtaining the first sequence $$\{(\tilde{t}_i)\}_{i=1}^{m},$$

refer to the foregoing related descriptions. Details are not described herein again. The following first describes an example method for obtaining the fifth sequence $$\{(\widetilde{py}_i)\}_{i=1}^{m} \text{ (or } \{(\widetilde{px}_i)\}_{i=1}^{m}\text{)}$$

and the sixth sequence $$\{(\tilde{x}_i)\}_{i=1}^{m} \text{ (or } \{(\tilde{y}_i)\}_{i=1}^{m}\text{)}.$$

In a possible implementation, the plurality of sequences further include a fifth sequence and a sixth sequence, the fifth sequence and the sixth sequence include the space information of the event data in the event chunk, and the fifth sequence further includes the event content information of the event data in the event chunk.

Step S22 further includes:

processing event content information of each piece of event data and first-dimensional space information or second-dimensional space information of the event data by using a preset second function, to obtain synthetic information;

performing subtraction between synthetic information of each piece of event data and synthetic information of a previous piece of event data, to obtain a fifth group of differences;

converting, by using a preset first function, a negative number in synthetic information of the event data ranking first and the fifth group of differences into a positive number;

obtaining the fifth sequence based on converted synthetic information of the event data ranking first and each difference in a converted fifth group of differences;

performing subtraction between second-dimensional space information of each piece of event data and second-dimensional space information of the previous piece of event data, or performing subtraction between first-dimensional space information of each piece of event data and first-dimensional space information of the previous piece of event data, to obtain a sixth group of differences;

converting, by using the preset first function, a negative number in second-dimensional information or first-dimensional information of the event data ranking first and the sixth group of differences into a positive number; and obtaining the sixth sequence based on converted second-dimensional information or first-dimensional information of the event data ranking first and each difference in a converted sixth group of differences.

For example, when the event data comes from the event camera, event content information of each event occupies only 1 bit, and an operation at a bit level in a modern programming language is not friendly. In consideration of this, the event content information and the space information may be spliced to obtain the synthetic information for representing the event content information and the space information. The synthetic information is processed to avoid the problem of the unfriendly operation.

For this, this disclosure proposes to process the event content information of each piece of event data and the first-dimensional space information or the second-dimensional space information of the event data by using the preset second function, to obtain the synthetic information. For example, when the second function is $py_i=y_i*2+p_i$, the function may be used to process event content information ($p_i$) of each piece of event data and second-dimensional space information ($y_i$) of the event data, to obtain synthetic information $$\{(py_i)\}_{i=1}^{m} = \{2y_1 + p_1, \ldots, 2y_m + p_m\}.$$

The event chunk 1 is used as an example. The synthetic information may be 259, 261, 259, and 261. Then, subtraction is performed between the synthetic information of each piece of event data and the synthetic information of the previous piece of event data (for example, a first-order difference of the synthetic information is calculated by using a delta function in the conventional technologies), to obtain a fifth group of differences $py_2-py_1, \ldots,$ and $py_m-py_{m-1}$. The event chunk 1 is used as an example. The fifth group of differences may be 2, −2, and 2. Then, the preset first function (for example, a zigzag function in the conventional technologies) is used to convert the negative number in the synthetic information of the event data ranking first and the fifth group of differences into the positive number. The event chunk 1 is used as an example. The synthetic information of the event data ranking first may be 259. The to-be-converted data may be {259, 2, −2, 2}. It is assumed that the zigzag function $$f(n) = \begin{cases} 2n, & n \geq 0 \\ -2n-1, & n < 0 \end{cases}$$

is used. In this case, {518, 4, 3, 4} may be obtained through conversion. Finally, the fifth sequence $$\{(\widetilde{py_i})\}_{i=1}^{m}$$

is obtained based on converted synthetic information of the event data ranking first and each difference in a converted fifth group of differences. The event chunk 1 is used as an example. The converted synthetic information of the event data ranking first is 518. All the differences in the converted fifth group of difference are respectively 4, 3, and 4. In this case, the obtained fifth sequence $$\{(\widetilde{py_i})\}_{i=1}^{m}$$

may be {518, 4, 3, 4}.

When the fifth sequence is obtained through processing the event content information and the second-dimensional space information, the sixth sequence may be obtained through processing the first-dimensional space information. For an example implementation, refer to the foregoing manner of obtaining the second sequence. Details are not described herein.

When the fifth sequence is obtained through processing the event content information and the first-dimensional space information, a method for obtaining the fifth sequence is the same as a method for obtaining the fifth sequence through processing the event content information and the second-dimensional space information. The second function is replaced with $px_i=x_i*2+p_i$, and the second-dimensional space information is replaced with the first-dimensional space information. Details are not described herein again. In this case, the sixth sequence may be obtained through processing the second-dimensional space information. For an example implementation, refer to the foregoing manner of obtaining the third sequence. Details are not described herein again.

In this manner, a manner of obtaining the plurality of sequences through processing is more flexible, and a problem in which a modern programming language is unfriendly to bit-level operations can be avoided, thereby reducing complexity of subsequent further processing of the plurality of sequences.

The foregoing describes an example manner of obtaining the plurality of sequences through processing the event chunk in this embodiment of this disclosure. After the plurality of sequences are obtained, the plurality of sequences are compressed to obtain data blocks in this embodiment of this disclosure. Based on a case in which the plurality of sequences in this embodiment of this disclosure have a feature in which "the quantity of elements whose element values are greater than the first threshold is greater than the quantity of elements whose element values are less than or equal to the first threshold", three preset compression manners are set in this embodiment of this disclosure.

During compression, a compression manner matching each sequence may be first determined, and then compression is performed. Adaptation may indicate that compressed data occupies smaller space.

In a possible implementation, when values of all elements in the sequence are the same and bit widths of all the elements are all b, the preset compression manner includes a first compression manner. In the first compression manner, the values of all the elements in the sequence are recorded by using a b-bit binary number. A value of b is recorded by using a B-bit binary number. Herein, both b and B are positive integers.

For example, when all the elements in the entire sequence are the same and are a constant u, the bit widths of the elements are definitely also the same. It is assumed that the bit width is equal to b. To be specific, the values of all the elements in the sequence are recorded by using the b-bit binary number. A common largest bit width of a computer processor is 64 bits. In other words, a maximum value of b is 64. When the value of b is recorded by using the B-bit binary number, a value of B may be preset to 6 ($2^6$=64). In this case, space occupied after the sequence is compressed in the first compression manner is b+B bits.

For example, when all the elements in the sequence are 9 (u=9), and a binary form of 9 is 1001, b may be equal to 4. This is equivalent to that the values 9 of all the elements in the sequence are recorded by using a 4 (b=4)-bit binary number 1001. For example, B is equal to 6. This is equivalent to recording the value 4 of b by using a 6 (B=6)-bit binary number 000100. In this case, the space occupied after the sequence is compressed in the first compression manner is 4+6=10 bits, and the compressed data is 000100/1001.

In this manner, when a constant sequence in which elements have the same values and bit widths are all b is compressed in the first compression manner, a data volume of compressed data is very low, to implement effect of reducing data storage costs.

In a possible implementation, when a largest bit width of elements in the sequence is b, the preset compression manner includes a second compression manner. In the second compression manner, a value of each element in the sequence is recorded by using a b-bit binary number. A value of b is recorded by using a B-bit binary number. Herein, both b and B are positive integers.

For example, when the largest bit width of the elements in the sequence is b, the value of each element in the sequence may be recorded by using the b-bit binary number. A common largest bit width of a computer processor is 64 bits. In other words, a maximum value of b is 64. When the value of b is recorded by using the B-bit binary number, a value of B may be preset to 6 ($2^6$=64). In this case, space occupied after the sequence is compressed in the second compression manner is m*b+B bits.

For example, when a sequence is {7, 0, 1, 0}, because a binary form of 7 is 111, a binary form of 0 is 0, and a binary form of 1 is 1, a largest bit width of elements in the sequence is b=3. This is equivalent to a case in which values of the elements in the sequence may be respectively recorded by using 3 (b=3)-bit binary numbers, for example, respectively, 111, 000, 001, and 000. For example, B is equal to 6. This is equivalent to recording the value 3 of b by using a 6 (B=6)-bit binary number 000011. In this case, the space occupied after the sequence is compressed in the second compression manner is 3*4+6=18 bits, and the compressed data is 000011/111/000/001/000.

In this manner, when a non-constant sequence is compressed in the second compression manner, a data volume of compressed data is very low, to implement effect of reducing data storage costs. In addition, there are more choices of compression manners, thereby improving sequence compression flexibility.

In a possible implementation, when bit widths of at least two elements in the sequence are different, and a largest bit width of elements in the sequence is b, the preset compression manner includes a third compression manner. In the third compression manner, a less than b is set, values of b and a each are recorded by using a B-bit binary number, low-a-bit data in a binary form of each element in the sequence is recorded by using a binary number whose bit width is equal to a, high-(b-a)-bit data in the binary form of the element in the sequence is recorded by using a binary number whose bit width is equal to b-a, and whether each element includes high-(b-a)-bit data is recorded by using a binary number whose bit width is equal to a quantity of elements in the sequence. Herein, b, B, and a are all positive integers.

For example, when a largest bit width of elements in the sequence is b, and bit widths of at least two elements in the sequence are different, a second bit width a that is less than b may be set (it is denoted that there are p(a) elements whose bit widths are less than or equal to a in the sequence). In this case, a*m bits may be used to store complete values of the p(a) elements and low-a-bit data of m-p(a) remaining elements (that is, low-a-bit data in a binary form of each element in the sequence is recorded by using a binary number whose bit width is equal to a), m bits may be used to record data whose bit width is greater than a (that is, whether each element includes high-(b-a)-bit data is recorded by using a binary number whose bit width is equal to a quantity of elements in the sequence), and (m-p(a))(b-a) bits may be used to record high b-a bits of each of the m-p(a) numbers (that is, high-(b-a)-bit data in a binary form of an element in the sequence is recorded by using a binary number whose bit width is equal to b-a). Space occupied in the third compression manner is 2B+(a+1)*m+(b-a)*(m-p(a))=2B+m+b*m-p(a)*(b-a), where 2B is space occupied for recording the values of b and a. A common largest bit width of a computer processor is 64 bits. In other words, a maximum value of b is 64. When the value of b is recorded by using the B-bit binary number, a value of B may be preset to 6 ($2^6$=64). An optimal value of a may be calculated based on specific data distribution. To be specific, a value of a that enables 2B+m+b*m-p(a)*(b-a) to reach the smallest is denoted as a*. In other words, space finally occupied in the third compression manner is 2B+m+b*m-p(a*)*(b-a*).

For example, when a sequence is {7, 0, 1, 0}, because a binary form of 7 is 111, a binary form of 0 is 0, and a binary form of 1 is 1, a largest bit width of elements in the sequence is b=3. In this case, a may be equal to 1 or 2. When a=1, p(a)=3. When a=2, p(a)=3.

After m=4, B=6, and b=3 are substituted into 2B+m+b*m-p(a)*(b-a), 28-p(a)*(3-a) is obtained. After a=1 and p(a)=3, and a=2 and p(a)=3 are separately substituted, 22 and 25 are obtained. Therefore, a*=1, and the space finally occupied in the third compression manner is 2B+m+b*m-p(a*)*(b-a*)=22.

In this case, low-a (a=1)-bit data in binary forms of elements in the sequence may be 1, 0, 1, and 0 respectively, and may be recorded by using m (m=4) a-bit binary numbers, that is, may be recorded by using 1, 0, 1, and 0 respectively. Whether each element includes data of high b-a (=2) bits is recorded by using a binary number whose bit width is equal to the quantity of elements in the sequence, and may be recorded by using 1000. When the first bit of 1000 is equal to 1, it indicates that the first element 7 has high-(b-a)-bit data. When the second to fourth bits are equal to 0, it indicates that the second to fourth elements do not have high-(b-a)-bit data. High-(b-a)-bit data of a binary form of an element in the sequence is recorded by using a binary number whose bit width is equal to b-a. For example, the high-(b-a)-bit data of the first element 7 may be recorded by using a binary number 11 whose bit width is equal to 2. For example, B is equal to 6. The values of b and a may be respectively recorded by using 6 (B=6)-bit binary numbers: 000011 and 000001. The compressed data may be 000011/000001/1/0/1/0/1000/11.

With reference to the foregoing description, it can be learned that a sequence in which all elements have the same value may be compressed by using any one of the foregoing compression manners. Because a quantity of occupied bits in the first compression manner is smaller, the first compression manner may be selected as a compression manner matching this type of sequence (a sequence in which all elements have the same value). A sequence in which at least two elements have different values and bit widths of all elements are the same may be compressed in the second compression manner or the third compression manner. In this case, a quantity of occupied bits in each optional compression manner may be first determined, and then a compression manner in which a quantity of occupied bits is smaller is selected as a compression manner matching the sequence. For a sequence in which at least two elements have different bit widths, the third compression manner may be directly selected as a compression manner matching the sequence. It should be noted that, in the third compression manner, selection of the value of a affects a quantity of occupied bits after compression. Therefore, when a quantity of occupied bits in the third compression manner is determined, an appropriate a may be determined as a*, so that the quantity of occupied bits after compression is the smallest. Then, the quantity of occupied bits in the third compression manner is compared with a quantity of occupied bits in the second compression manner. Alternatively, the appropriate a is directly used to complete compression.

In this manner, when the non-constant sequence is compressed in the third compression manner, the data volume of the compressed data is very low, to implement effect of reducing data storage costs. In addition, there are more choices of compression manners, thereby improving sequence compression flexibility.

The following uses an example in which the event chunk 1 includes a first sequence $$\{(\tilde{t}_i)\}_{i=1}^{m},$$

a fifth sequence $$\{(p\tilde{y}_i)\}_{i=1}^{m},$$

and a sixth sequence $$\{(\tilde{x}_i)\}_{i=1}^{m},$$

to provide an example of determining a compression manner of a sequence obtained through processing the event chunk 1.

(1) Example of Compressing the First Sequence $$\{(\tilde{t}_i)\}_{i=1}^{m}$$

The first sequence $$\{(t_i)\}_{i=1}^{m} = \{1652518200000000, 1, 1, 1\}$$

is obtained through processing the event data included in the event chunk 1. Because four elements are different, the first compression manner cannot be used. An element with the largest bit width in the sequence is 1652518200000000, and the bit width is 51. If the second compression manner is used, b=51, m=4, B=6, and m*b+B=4*51+6=210 bits are occupied. If the third compression manner is used, b=51, m=4, B=6, and it may be determined that when a=1, 2B+m+b*m-p(a)*(b-a) reaches the smallest value: 70 bits. Therefore, a quantity of occupied bits is smaller in the third compression manner, and the third compression manner may be selected as an adaptable compression manner to compress the first sequence $$\{(\tilde{t}_i)\}_{i=1}^{m}.$$

Compressed data is as follows:

(the value of b is recorded by using B=6 bits);

000001 (the value of a is recorded by using B=6 bits);

0111 (low a=1 bits of the four elements);

1000 (4 bits indicate whether the four elements have data more than 1 bit, where 1 indicates yes, and 0 indicates no); and 10111011110111101001110000001001011101111100000000 (high 50 bits of the first element are recorded by using b-a=50 bits).

In this case, the data obtained after the first sequence is compressed may be: 1100110000010111100010111011110111101001110000001001011101111100000000.

Correspondingly, when the event data included in the event chunk 1 is processed to obtain a metadata block, a compression manner in the metadata block may indicate that the third compression manner is used for the first sequence.

(2) Example of Compressing the Sixth Sequence $$\{(\tilde{x}_i)\}_{i=1}^{m}$$

The sixth sequence $$\{(\tilde{x}_i)\}_{i=1}^{m}, = \{258, 0, 2, 0\}$$

is obtained through processing the event data included in the event chunk 1. Because four elements are different, the first compression manner cannot be used. An element with the largest bit width in the sequence is 258, and the bit width is 9. If the second compression manner is used, b=9, m=4, B=6, and m*b+B=4*9+6=42 bits are occupied. If the third compression manner is used, b=9, m=4, B=6, and it may be determined that when a=2, 2B+m+b*m-p(a)*(b-a) reaches the smallest value: 31 bits. Therefore, a quantity of occupied bits is smaller in the third compression manner, and the third compression manner may be selected as an adaptable compression manner to compress the sixth sequence $$\{(\tilde{x}_i)\}_{i=1}^{m}.$$

Compressed data is as follows:

001001 (the value of b is recorded by using B=6 bits);

000010 (the value of a is recorded by using B=6 bits);

10 00 10 00 (low a=2 bits of the four elements);

1000 (4 bits indicate whether the four elements have data more than 1 bit, where 1 indicates yes, and 0 indicates no); and 1000000 (high 7 bits of the first element are recorded by using b-a=7 bits).

In this case, the data obtained after the sixth sequence is compressed may be: 0010010000101000100010001000000.

Correspondingly, when the event data included in the event chunk 1 is processed to obtain a metadata block, a compression manner in the metadata block may further indicate that the third compression manner is used for the sixth sequence.

(3) Example of Compressing the Fifth Sequence $$\{(p\tilde{y}_i)\}_{i=1}^{m}$$

The fifth sequence $$\{(p\tilde{y}_i)\}_{i=1}^{m} = \{518, 4, 3, 4\}$$

is obtained through processing the event data included in the event chunk 1. Because four elements are different, the first compression manner cannot be used. An element with the largest bit width in the sequence is 518, and the bit width is 10. If the second compression manner is used, b=10, m=4, B=6, and m*b+B=4*9+6=46 bits are occupied. If the third compression manner is used, b=10, m=4, B=6, and it may be determined that when a=3, 2B+m+b*m-p(a)*(b-a) reaches the smallest value: 35 bits. Therefore, a quantity of occupied bits is smaller in the third compression manner, and the third compression manner may be selected as an adaptable compression manner to compress the fifth sequence $$\{(p\tilde{y}_i)\}_{i=1}^{m}.$$

Compressed data is as follows:

001010 (the value of b is recorded by using B=6 bits);

000011 (the value of a is recorded by using B=6 bits);

110 100 011 100 (low a=3 bits of the four elements);

1000 (4 bits indicate whether the four elements have data more than 1 bit, where 1 indicates yes, and 0 indicates no); and 1000000 (high 7 bits of the first element are recorded by using b-a=7 bits).

In this case, the data obtained after the fifth sequence is compressed may be: 00101000001111010001110010001000000.

Correspondingly, when the event data included in the event chunk 1 is processed to obtain a metadata block, a compression manner in the metadata block may further indicate that the third compression manner is used for the fifth sequence.

It can be learned that if compression is not performed, the event data in the event chunk 1 needs a total of 4*(64+16+16+1)=388 bits. However, after the data storage method in this embodiment of this disclosure is used, only 60+31+35=136 bits are needed, thereby greatly saving storage space. A person skilled in the art should understand that a case in which the event chunk 1 includes four events is merely used as an example herein. In actual use, one event chunk may include thousands of events. Therefore, better effect of saving storage space is implemented.

Corresponding to the foregoing data storage method, an embodiment of this disclosure further provides a data reading method, to conveniently read needed event data. The following describes the data reading method in embodiments of this disclosure with reference to FIG. 6 to FIG. 8.

FIG. 6 is a flowchart of a data reading method according to an embodiment of this disclosure.

As shown in FIG. 6, in a possible implementation, this disclosure provides a data reading method. The method is applied to a processor. The method includes steps S6 to S8.

Step S6: Obtain a plurality of metadata blocks from a second storage area. The plurality of metadata blocks correspond to a plurality of data blocks. Each data block includes a part of processed event data. Each metadata block includes a start time, an end time, a quantity, and a compression manner of event data in a data block corresponding to the metadata block, and a storage address of the data block.

A metadata block and a data block may be obtained through processing event data with a specific association. It can be learned from the foregoing description that the event data includes a timestamp (also referred to as time information below). Therefore, a start time of event data in the data block corresponding to the metadata block may be an earliest timestamp (time information) of all the event data, and an end time of the event data in the data block corresponding to the metadata block may be a latest timestamp (time information) of all the event data. A compression manner of the event data in the data block corresponding to the metadata block may be the first compression manner, the second compression manner, the third compression manner, or the like described above.

FIG. 7 shows an example of metadata blocks and data blocks that are stored according to an embodiment of this disclosure. In the example in FIG. 7, there may be three obtained metadata blocks. A metadata block 1 corresponds to a data block 1. A start time included in the metadata block 1 is 1 ms, an end time included in the metadata block 1 is 3 ms, and a storage address 1 included in the metadata block 1 is a storage address of the data block 1 in a first storage area. A metadata block 2 corresponds to a data block 2. A start time included in the metadata block 2 is 4 ms, an end time included in the metadata block 2 is 7 ms, and a storage address 2 included in the metadata block 2 is a storage address of the data block 2 in the first storage area. A metadata block 3 corresponds to a data block 3. A start time included in the metadata block 3 is 8 ms, an end time included in the metadata block 3 is 9 ms, and a storage address 3 included in the metadata block 3 is a storage address of the data block 3 in the first storage area.

Step S7: Find, in the plurality of metadata blocks, at least one metadata block that includes a start time and an end time between which any time point is in a target time interval. It may be understood that, if it is determined that a start time (or an end time) included in a specific metadata block is already in the target time interval, there may be no need to determine whether the end time (or the start time) included in the metadata block is in the target time interval, to reduce data processing costs and improve data reading efficiency. In this manner, a metadata block that has an intersection with the target time interval may be determined.

In the example in FIG. 7, it is assumed that the target time interval is 4 milliseconds and 50 microseconds to 6 milliseconds and 800 microseconds. In this case, the at least one metadata block that includes the start time and the end time between which any time point is in the target time interval may be the metadata block 2.

Step S8: Obtain, from a first storage area based on a storage address in the at least one found metadata block, at least one data block corresponding to the at least one found metadata block, and process the data block based on a compression manner in a found metadata block corresponding to each data block, to obtain to-be-read event data.

According to the steps of the data storage method, it may be considered that compressed data corresponding to the to-be-read event data is in the data block corresponding to the determined metadata block. Therefore, the at least one data block corresponding to the at least one found metadata block is obtained from the second storage area based on the storage address of the at least one found metadata block. In the example in FIG. 7, the data block 2 may be obtained from the first storage area based on the storage address 2 in the metadata block 2.

For each obtained data block, information needed for decompression, such as a compression manner, may be obtained from a metadata block corresponding to the data block, and then decompression processing is performed in a corresponding decompression manner to obtain all compressed event data in the data block. For an example of a decompression processing manner corresponding to each compression manner, refer to the following description of step S81. After all the compressed event data in the data block is obtained through decompression processing, screening may be performed on time information of each piece of event data based on the target time interval, to obtain, through screening, event data whose time information is in the target time interval. This part of time data is to-be-read event data. In the example in FIG. 7, event data whose time information is between 4 milliseconds and 50 microseconds to 6 milliseconds and 800 microseconds may be extracted from event data obtained by decompressing the data block 2. In this case, the data block 1 and the data block 3 do not need to be obtained and decompressed.

According to the data reading method in this embodiment of this disclosure, the plurality of metadata blocks are obtained from the second storage area, and the at least one metadata block whose start time and/or end time are/is in the target time interval is found from the plurality of metadata blocks, so that the at least one found metadata block can be a metadata block that has an intersection with the target time interval. In addition, the metadata block corresponds to the data block. Each data block includes the part of processed event data. Each metadata block includes the start time, the end time, the quantity, and the compression manner of the event data in the data block corresponding to the metadata block, and the storage address of the data block. In this case, the part of processed event data included in the data block corresponding to the at least one metadata block includes the to-be-read event data. In other words, a query of a time interval is supported. The at least one data block corresponding to the at least one found metadata block may be obtained from the first storage area based on the storage address of the at least one found metadata block, to avoid obtaining of all the data blocks, thereby reducing data processing costs required for obtaining the data block and data storage costs required for storing the obtained data block by the processor. The data block is processed based on the compression manner in the found metadata block corresponding to each data block, to obtain the to-be-read event data. On-demand reading can be supported without decompressing all the data blocks. Only related data needs to be read, and not all data needs to be read. Therefore, according to the data reading method in this embodiment of this disclosure, when the event data is read, the event data that needs to be read can be read without obtaining and decompressing all the data blocks, thereby supporting selective data reading, reducing data processing costs and data storage costs, and improving data reading efficiency.

FIG. 8 is a diagram of a method for processing an obtained corresponding data block to obtain to-be-read event data according to an embodiment of this disclosure.

As shown in FIG. 8, in a possible implementation, step S8 includes steps S81 and S82.

Step S81: Perform decompression processing on the data block based on the compression manner in the found metadata block corresponding to each data block, to obtain a plurality of decompressed sequences. The plurality of sequences include time information, space information, and event content information of event data in an event chunk corresponding to the data block. A quantity of elements in each sequence is equal to a quantity of pieces of event data in the event chunk. An element value in each sequence is an integer greater than or equal to 0. A quantity of elements whose element values are greater than a first threshold is greater than a quantity of elements whose element values are less than or equal to the first threshold.

Step S82: Process the plurality of decompressed sequences obtained through decompression processing performed on each data block, to obtain the event chunk corresponding to each data block.

Step S83: Use, as the read event data, event data that is in event data included in all event chunks and whose time information is in the target time interval.

For example, it can be learned from the foregoing description that one data block may be obtained based on a plurality of pieces of compressed data, and the plurality of pieces of compressed data are obtained by separately compressing a plurality of sequences. Therefore, it is assumed that the plurality of sequences include a first sequence, a fifth sequence, and a sixth sequence, and a compression manner corresponding to one metadata block indicates that the third compression manner is used for all of the first sequence, the fifth sequence, and the sixth sequence. In this case, when decompression processing is performed on the data block based on the compression manner in the found metadata block corresponding to each data block, decompression processing may be performed on each piece of compressed data based on the third compression manner, to obtain a plurality of decompressed sequences. The plurality of sequences may include time information, space information, and event content information of event data in the event chunk corresponding to the data block. A quantity of elements in each sequence is equal to a quantity of pieces of event data in the event chunk. An element value in each sequence is an integer greater than or equal to 0. A quantity of elements whose element values are greater than a first threshold is greater than a quantity of elements whose element values are less than or equal to the first threshold. An example implementation of step S82 is further described below with reference to a plurality of compression manners.

The plurality of decompressed sequences obtained through decompression processing performed on each data block is processed, to obtain the event chunk corresponding to each data block. Each obtained event chunk includes a part of to-be-read event data. For example, the element in the sequence may be processed based on an inverse function of a function (the first function, the second function, or the like) used in the foregoing data storage method, to obtain the time information, the space information, and the event content information in the event data, thereby obtaining the event chunk corresponding to the data block. An example implementation of step S83 is further described below with reference to types of information included in the plurality of sequences.

Event data that is in event data included in all event chunks and whose time information is in the target time interval is used as the read event data. For an example implementation, refer to the related description in FIG. 7 above. Details are not described herein again.

In this manner, each data block may be decompressed to obtain a plurality of sequences, and then an original event chunk may be restored based on the plurality of sequences. Therefore, storing the event data in a data block form does not affect accuracy of subsequently using the event data in the event chunk obtained through decompression. In this way, it can be ensured that both data storage costs and data reading costs are low. In addition, data accuracy can be ensured.

The following describes an example method for obtaining the plurality of sequences through decompression according to an embodiment of this disclosure.

In a possible implementation, the data block includes a plurality of pieces of compressed data, and step S81 includes:

- when the compression manner corresponding to the metadata block indicates that a compression manner of any compressed data is a first compression manner, reading a B-bit binary number from the compressed data;
- determining a value of b based on a decimal form of the B-bit binary number, and further reading a b-bit binary number from the compressed data; and
- using a decimal form of the b-bit binary number as a value of each element in the sequence, to obtain a decompressed sequence, where both b and B are positive integers.

For example, it can be learned from the foregoing description that, if a sequence is compressed in the first compression manner, it indicates that all elements in the sequence are the same, and when the sequence is compressed, values of all the elements in the sequence are recorded by using a b-bit binary number, where a value of b is compressed in a manner of performing recording by using a B-bit binary number. In other words, the compressed data includes two meaningful binary numbers: One binary number is a B-bit binary number indicating the (decimal) value of b, and the other binary number is a b-bit binary number indicating the (decimal) values of all the elements in the sequence.

In this case, when a piece of compressed data whose compression manner is the first compression manner is decompressed, a B-bit binary number may be first read from the compressed data, where a decimal form of the B-bit binary number is equal to a value of b; and then a b-bit binary number is further read from the compressed data based on the value of b. In this way, values of all elements in a sequence can be determined based on a decimal form of the b-bit binary number.

For example, it is assumed that B=6, a quantity of pieces of event data is 4, and compressed data is 0001001001. In this case, 6-bit binary number 000100 may be first read from the compressed data, and a decimal form of 000100 is 4 (b=4). Therefore, a 4-bit binary number 1001 is further read from the compressed data, and a decimal form of 1001 is 9. In other words, all elements in the sequence obtained through decompression are 9, that is, a sequence obtained after decompression is {9, 9, 9, 9}.

In this manner, data compressed in the first compression manner can be decompressed, and a sequence after decompression can be the same as a sequence before compression, thereby ensuring decompression accuracy.

In a possible implementation, the data block includes a plurality of pieces of compressed data, and step S81 includes:

- when the compression manner corresponding to the metadata block indicates that a compression manner of any compressed data is a second compression manner, reading a B-bit binary number from the compressed data;
- determining a value of b based on a decimal form of the B-bit binary number;
- further sequentially reading a b-bit binary number from the compressed data until a quantity of read b-bit binary numbers is equal to a quantity that is of pieces of event data and that is indicated by the metadata block; and
- using a decimal form of the sequentially read b-bit binary number as a value of each element in the sequence, to obtain a decompressed sequence, where both b and B are positive integers.

For example, it can be learned from the foregoing description that, if a sequence is compressed in the second compression manner, it indicates that when the sequence is compressed, a value of each element in the sequence is recorded by using a b-bit binary number, where a value of b is compressed in a manner of performing recording by using a B-bit binary number. In other words, the compressed data includes m+1 meaningful binary numbers (m is a quantity of elements in the sequence, and is equal to a quantity of events in an event chunk): One binary number is a B-bit binary number indicating a (decimal) value of b, and the remaining m binary numbers are b-bit binary numbers respectively indicating (decimal) values of m elements in the sequence.

In this case, when a piece of compressed data whose compression manner is the second compression manner is decompressed, a B-bit binary number may be first read from the compressed data, where a decimal form of the B-bit binary number is equal to a value of b; and then m b-bit binary numbers are further sequentially read from the compressed data based on the value of b, where a value of m may be a quantity of pieces of event data included in a metadata block. Decimal forms of the m sequentially read b-bit binary numbers are respectively used as values of elements in the sequence, to obtain a decompressed sequence.

For example, it is assumed that B=6, m=4, and compressed data is 000011111000001000. A 6-bit binary number 000011 may be first read from the compressed data, and a decimal form of 000011 is 3 (b=3). In this case, four (m=4) 3 (b=3)-bit binary numbers 111, 000, 001, and 000 are further sequentially read from the compressed data, and decimal forms are respectively 7, 0, 1, and 0. In other words, elements in the sequence obtained through decompression are respectively 7, 0, 1, and 0, that is, the sequence obtained through decompression is {7, 0, 1, 0}.

In this manner, data compressed in the second compression manner can be decompressed, and a sequence after decompression can be the same as a sequence before compression, thereby ensuring decompression accuracy.

In a possible implementation, the data block includes a plurality of pieces of compressed data, and step S81 includes:

- when the compression manner corresponding to the metadata block indicates that a compression manner of any compressed data is a third compression manner, sequentially reading two B-bit binary numbers from the compressed data;
- determining a value of b and a value of a respectively based on decimal forms of the two B-bit binary numbers;
- further sequentially reading an a-bit binary number from the compressed data until a quantity of read a-bit binary numbers is equal to a quantity that is of pieces of event data and that is indicated by the metadata block;
- using the sequentially read a-bit binary number as low a bits of each element in the sequence;
- further reading, from the compressed data, a binary number whose bit width is equal to the quantity that is of pieces of event data and that is indicated by the metadata block, and determining, based on each bit of the binary number, whether each element in the sequence includes high-(b-a)-bit data;
- further sequentially reading a (b-a)-bit binary number from the compressed data until a quantity of read (b-a)-bit binary numbers is equal to a quantity of determined elements that each include high-(b-a)-bit data; and
- using the read (b-a)-bit binary number as high b-a bits of an element that includes high-(b-a)-bit data in the sequence, where b, B, and a are all positive integers.

For example, it can be learned from the foregoing description that, if a sequence is compressed in the third compression manner, it indicates that when the sequence is compressed, a less than b is set, values of b and a each are recorded by using a B-bit binary number, low-a-bit data in a binary form of each element in the sequence is recorded by using a binary number whose bit width is equal to a product of a and a quantity of elements in the sequence, high-(b-a)-bit data in the binary form of the element in the sequence is recorded by using a binary number whose bit width is equal to b-a, and whether each element includes high-(b-a)-bit data is compressed in a manner of performing recording by using a binary number whose bit width is equal to the quantity of elements in the sequence.

In this case, when a piece of compressed data whose compression manner is the third compression manner is decompressed, two B-bit binary numbers may be first read from the compressed data, where a decimal form of a first B-bit binary number is equal to a value of b, and a decimal form of a second B-bit binary number is equal to a value of a. Then, m a-bit binary numbers are further sequentially read from the compressed data based on the value of a, where a value of m may be a quantity of pieces of event data included in a metadata block, and may also be a quantity of elements in the sequence. The m read a-bit binary numbers each may be used as low a bits of each element in the sequence. Then, an m-bit binary number is further read from the compressed data. It is determined, based on whether a value of each bit of the m-bit binary number is 1 or 0, whether each element further has high-(b-a)-bit data. If the value is 1, it may be considered that high-(b-a)-bit data exists. If the value is 0, it may be considered that no high-(b-a)-bit data exists. A quantity of elements that each include high-(b-a)-bit data is determined based on a quantity of is in the m-bit binary number. Then, a (b-a)-bit binary number is further read from the compressed data until a quantity of read (b-a)-bit binary numbers is equal to determined (b-a)-bit binary numbers. The read (b-a)-bit binary number is respectively used as high b-a bits of an element that includes high-(b-a)-bit data in the sequence, and is spliced with low a bits of the element. Low a bits of another element remain unchanged. Correspondingly obtained decimal forms are values of all the elements, to obtain a decompressed sequence.

For example, it is assumed that B=6, m=4, and compressed data is 0000110000011010100011. 6-bit binary numbers 000011 and 000001 may be first read from the compressed data. A decimal form of 000011 is 3, so that it can be determined that b=3. A decimal form of 000001 is 1, so that it can be determined that a=1. Then, four (m=4) 1-bit (a=1) binary numbers 1, 0, 1, and 0 are further sequentially read from the compressed data, and decimal forms of the binary numbers are respectively 1, 0, 1, and 0. In other words, low 1 (a=1) bits of elements in a sequence obtained through decompression are respectively 1, 0, 1, and 0. A 4 (m=4)-bit binary number 1000 is further sequentially read from the compressed data. Only the first element has high-2 (b-a=2)-bit data. One (a quantity of is in 1000 is 1) 2 (b-a=2)-bit binary number 11 is further read from the compressed data, and used as high 2 (b-a=2) bits of the first element in the sequence. The high 2 bits are spliced with a low 1 (a=1) bit of the element to obtain 111. Low-a-bit data of another element remains unchanged, that is, 0, 1, and 0. Correspondingly obtained decimal forms are 7, 0, 1, and 0 that are values of all elements. In other words, the sequence obtained through decompression is {7, 0, 1, 0}.

In this manner, data compressed in the third compression manner can be decompressed, and a sequence after decompression can be the same as a sequence before compression, thereby ensuring decompression accuracy.

The following uses an example in which the data block includes compressed data 11001100000101111000101110111101111101 0011100000001001011101111100000000 of a first sequence $$\{(\tilde{t}_l)\}_{i=1}^{m},$$

compressed data 0010100000111101000111001000100000 of a fifth sequence $$\{(p\tilde{y}_l)\}_{i=1}^{m},$$

and compressed data 00100100001010001000100010000000 of a sixth sequence $$\{(\tilde{x}_i)\}_{i=1}^{m},$$

to provide examples of manners of obtaining the first sequence, the fifth sequence, and the sixth sequence through decompression.

(1) Example of Decompressing the Compressed Data of the First Sequence $$\{(\tilde{t}_i)\}_{i=1}^{m}$$

It is determined based on the compression manner in the metadata block that the third compression manner is used for the compressed data of the first sequence $$\{(\tilde{t}_i)\}_{i=1}^{m},$$

the compressed data of the first sequence $$\{(\tilde{t}_i)\}_{i=1}^{m}$$

is 110011000001011110001011101111011110 10011100000001001011101111100000000. A quantity m of pieces of event data is equal to 4. Therefore, two 6 (B=6)-bit binary numbers are first read to obtain 110011 and 000001, to determine that b=51 and a=1. Then, four (m=4) 1 (a=1)-bit binary numbers are sequentially read to obtain 0, 1, 1, and 1, to determine that low-1-bit data of the four elements is respectively 0, 1, 1, and 1. Then, one 4-bit binary number is read to obtain 1000. In this case, it can be determined that only the first element has high-bit data, and the high-bit data has 50 (b=51, a=1, and b-a=50) bits in total. Therefore, one 50-bit binary number is further read to obtain 1011101111011110100111000000 0100101110111110000000000 that is spliced with low-bit data 0 of the first element, thereby obtaining 1011101111011110100111000000 01001011101111100000000000. In this case, binary forms of the four elements in the first sequence are respectively 10111011110111101001110000000100101110111111 000000000, 1, 1, and 1. After the binary forms are converted into decimal forms, the first sequence is obtained as {1652518200000000, 1, 1, 1}.

(2) Example of Decompressing the Compressed Data of the Sixth Sequence $$\{(\tilde{x}_i)\}_{i=1}^{m}$$

It is determined based on the compression manner in the metadata block that the third compression manner is used for the compressed data of the sixth sequence $$\{(\tilde{x}_i)\}_{i=1}^{m}.$$

The compressed data of the sixth sequence $$\{(\tilde{x}_i)\}_{i=1}^{m}$$

is 00100100001010001000100010000000. A quantity m of pieces of event data is 4. Therefore, two 6 (B=6)-bit binary numbers are first read to obtain 001001 and 000010, to determine that b=9 and a=2. Then, four (m=4) 2 (a=2)-bit binary numbers are sequentially read to obtain 10, 00, 10, and 00, to determine that low-2-bit data of the four elements is respectively 10, 00, 10, and 00. Then, one 4-bit binary number is read to obtain 1000. In this case, it can be determined that only the first element has high-bit data, and the high-bit data has 7 (b=9, a=2, and b-a=7) bits in total. Therefore, one 7-bit binary number is further read to obtain 1000000 that is spliced with low-bit data 10 of the first element, thereby obtaining 100000010. In this case, binary forms of the four elements in the sixth sequence are respectively 100000010, 00, 10, and 00. After the binary forms are converted into decimal forms, the first sequence is obtained as {258, 0, 2, 0}.

(3) Example of Decompressing the Compressed Data of the Fifth Sequence $$\{(\widetilde{py}_i)\}_{i=1}^{m}$$

It is determined based on the compression manner in the metadata block that the third compression manner is used for the compressed data of the fifth sequence $$\{(\widetilde{py}_i)\}_{i=1}^{m}.$$

The compressed data of the fifth sequence $$\{(\widetilde{py}_i)\}_{i=1}^{m}$$

00101000001111010001110010001000000. A quantity m of pieces of event data is 4. Therefore, two 6 (B=6)-bit binary numbers are first read to obtain 001010 and 000011, to determine that b=10 and a=3. Then, four (m=4) 3 (a=3)-bit binary numbers are sequentially read to obtain 110, 100, 011, and 100, to determine that low-3-bit data of the four elements is respectively 110, 100, 011, and 100. Then, one 4-bit binary number is read to obtain 1000. In this case, it can be determined that only the first element has high-bit data, and the high-bit data has 7 (b=10, a=3, and b-a=7) bits in total. Therefore, one 7-bit binary number is further read to obtain 1000000 that is spliced with low-bit data 110 of the first element, thereby obtaining 1000000110. In this case, binary forms of the four elements in the sixth sequence are respectively 1000000110, 100, 011, and 100. After the binary forms are converted into decimal forms, the fifth sequence is obtained as {518, 4, 3, 4}.

The following describes an example method for obtaining an event chunk through performing processing based on a plurality of sequences obtained through decompression according to an embodiment of this disclosure.

It can be learned from the foregoing description that, when the data storage method is performed, in a possible implementation, data $$\{(t_i, x_i, y_i, p_i)\}_{i=1}^{m}$$

in an event chunk is preprocessed to obtain four sequences by using spatial-temporal redundancy of the data: a first sequence $$\{(\tilde{t}_i)\}_{i=1}^{m},$$

a second sequence $$\{(\tilde{x}_i)\}_{i=1}^{m},$$

a third sequence $$\{(\tilde{y}_i)\}_{i=1}^{m},$$

and a fourth sequence $$\{(\tilde{p}_i)\}_{i=1}^{m}.$$

During compression, the four sequences are separately compressed. Therefore, when the data block is decompressed, the four sequences are also obtained through decompression. When the event chunk is obtained through processing performed based on the plurality of sequences obtained through decompression, time information, space information, and event content information in the event chunk may be obtained through processing performed based on the first sequence $$\{(\tilde{t}_i)\}_{i=1}^{m},$$

the second sequence $$\{(\tilde{x}_i)\}_{i=1}^{m},$$

the third sequence $$\{(\tilde{y}_i)\}_{i=1}^{m},$$

and the fourth sequence $$\{(\tilde{p}_i)\}_{i=1}^{m}$$

that are obtained through decompression, to obtain the event chunk.

The following describes an example method for obtaining the time information in the event chunk through processing the first sequence obtained through decompression according to an embodiment of this disclosure.

In a possible implementation, the plurality of sequences include the first sequence, and the first sequence includes the time information of the event data in the event chunk. Step S82 includes:

- for any first sequence, performing summation on each element in the first sequence and all elements before the element, to obtain a first group of sum values; and
- using a first element in the first sequence and all sum values in the first group of sum values respectively as the time information of the event data in the event chunk corresponding to the first sequence.

For example, when the time information in the event chunk is obtained through processing performed based on the first sequence, inverse processing is performed based on a manner of obtaining the first sequence through processing the event chunk. For a manner of obtaining the first sequence through processing the event chunk, refer to the related description of step S22. In this case, when inverse processing is performed, summation (for example, implemented by using an inverse function of a delta function in the conventional technologies) may be performed on each element in the first sequence and all elements before the element, to obtain a first group of sum values. A first element in the first sequence and all sum values in the first group of sum values are respectively used as the time information of the event data in the event chunk corresponding to the first sequence.

For example, when the first sequence is {1652518200000000, 1, 1, 1}, the first group of sum values is 1652518200000001, 1652518200000002, and 1652518200000003, and the time information of the event data in the event chunk corresponding to the first sequence is 1652518200000000, 1652518200000001, 1652518200000002, and 1652518200000003.

In this manner, for each first sequence, time information in an event chunk corresponding to the first sequence may be obtained through processing, and the event chunk corresponding to the first sequence may be obtained with reference to space information and event content information in the event chunk corresponding to the first sequence.

In a possible implementation, the plurality of sequences further include the second sequence, the third sequence, and the fourth sequence. The second sequence includes first-dimensional space information of the event data in the event chunk. The third sequence includes second-dimensional space information of the event data in the event chunk. The fourth sequence includes the event content information of the event data in the event chunk. Step S82 further includes:

- for any second sequence, third sequence, or fourth sequence, converting each element in the second sequence, the third sequence, or the fourth sequence by using an inverse function of a preset first function, to obtain a converted element;
- performing summation on each converted element and all elements before the element, to obtain a second group of sum values, a third group of sum values, or a fourth group of sum values; and using a converted first element and each sum value in a converted second group of sum values as the first-dimensional space information of the event data in the event chunk corresponding to the second sequence, or using a converted first element and each sum value in a converted third group of sum values as the second-dimensional space information of the event data in the event chunk corresponding to the third sequence, or using a converted first element and each sum value in a converted fourth group of sum values as the event content information of the event data in the event chunk corresponding to the fourth sequence.

For example, when the first-dimensional space information in the event chunk is obtained through processing performed based on the second sequence, the second-dimensional space information in the event chunk is obtained through processing performed based on the third sequence, and the event content information in the event chunk is obtained through processing performed based on the fourth sequence, inverse processing is performed in a manner of obtaining the second sequence, the third sequence, and the fourth sequence by processing the event chunk. For the manner of obtaining the second sequence, the third sequence, and the fourth sequence through processing the event chunk, refer to the related description of step S22 in the foregoing data storage method part. In this case, when inverse processing is performed, for example, if the second sequence is {258, 0, 2, 0}, each element in the second sequence may be converted by using the inverse function of the preset first function (for example, a zigzag function in the conventional technologies). It is assumed that the zigzag function $$f(n) = \begin{cases} 2n, & n \geq 0 \\ -2n-1, & n < 0 \end{cases}$$

is used. {129, 0, 1, 0} may be obtained through conversion. Then, summation (for example, implemented by using the inverse function of the delta function in the conventional technologies) is performed on each element in {129, 0, 1, 0} and all elements before the element, to obtain a first group of sum values 129, 130, and 130. The first element 129 in {129, 0, 1, 0} and each sum value 129, 130, or 130 in the first group of sum values are used as first-dimensional space information of the event data in the event chunk corresponding to the second sequence. In other words, the first-dimensional information of the event data in the event chunk corresponding to the second sequence is 129, 129, 130, and 130.

The second-dimensional information of the event data in the event chunk corresponding to the third sequence may be obtained through replacing the second sequence with the third sequence. This is similar to a manner of obtaining the first-dimensional information of the event data in the event chunk corresponding to the second sequence. For example, the third sequence is {258, 2, 1, 0}. The second-dimensional information of the event data in the event chunk corresponding to the third sequence may be 129, 130, 129, and 130. The event content information of the event data in the event chunk corresponding to the fourth sequence may be obtained through replacing the second sequence with the fourth sequence. This is similar to a manner of obtaining the first-dimensional information of the event data in the event chunk corresponding to the second sequence. For example, the fourth sequence is {1, 1, 1, 1}. The event content information of the event data in the event chunk corresponding to the fourth sequence may be 1, 1, 1, and 1.

Further, when the event data is generated by an event camera, and the event content information indicates a polarity of the event data, because the polarity of the event data is usually 0 or 1, in this case, an element in the fourth sequence may be directly used as the event content information of the event data in the event chunk. The event chunk 1 is used as an example. The fourth sequence $$\{(\tilde{p}_i)\}_{i=1}^{m}$$

may be {1, 1, 1, 1}. Event content information of pieces of event data may be respectively 1, 1, 1, and 1.

In this manner, for each second sequence/third sequence/fourth sequence, the space information/event content information in the event chunk corresponding to the second sequence/third sequence/fourth sequence may be obtained through processing, and the event chunk corresponding to the second sequence/third sequence/fourth sequence may be obtained with reference to the time information in the event chunk corresponding to the second sequence/third sequence/fourth sequence, so that application of the data reading method is more flexible.

The following describes another example method for obtaining an event chunk through performing processing based on a plurality of sequences obtained through decompression according to an embodiment of this disclosure.

It can be learned from the foregoing description that, when the data storage method is performed, in a possible implementation, data $$\{(t_i, x_i, y_i, p_i)\}_{i=1}^{m}$$

in an event chunk is preprocessed to obtain three sequences by using spatial-temporal redundancy of the data: a first sequence $$\{(\tilde{t}_i)\}_{i=1}^{m},$$

a fifth sequence $$\{(\widetilde{py}_i)\}_{i=1}^{m} \text{ (or } \{(\widetilde{px}_i)\}_{i=1}^{m}\text{)},$$

and a sixth sequence $$\{(\tilde{x}_i)\}_{i=1}^{m} \text{ (or } \{(\tilde{y}_i)\}_{i=1}^{m}\text{)}.$$

During compression, the three sequences are separately compressed. Therefore, when the data block is decompressed, the three sequences are also obtained through decompression. When the event chunk is obtained through processing performed based on the plurality of sequences obtained through decompression, the time information in the event chunk may be obtained through processing performed based on the first sequence $$\{(\tilde{t}_i)\}_{i=1}^{m}$$

obtained through decompression, the space information in the event chunk may be obtained through processing performed based on the fifth sequence $$\{(\widetilde{py}_i)\}_{i=1}^{m}(\text{or } \{(\widetilde{px}_i)\}_{i=1}^{m})$$

and the sixth sequence $$\{(\tilde{x}_i)\}_{i=1}^{m}(\text{or } \{(\tilde{y}_i)\}_{i=1}^{m}),$$

and the event content information may be obtained through processing performed based on the fifth sequence $$\{(\widetilde{py}_i)\}_{i=1}^{m}(\text{or } \{(\widetilde{px}_i)\}_{i=1}^{m}),$$

to obtain the event chunk.

For a manner of obtaining the time information in the event chunk through processing performed based on the first sequence $$\{(\tilde{t}_i)\}_{i=1}^{m}$$

obtained through decompression, refer to the foregoing related descriptions. Details are not described herein again. The following describes an example method for obtaining the space information in the event chunk through processing performed based on the fifth sequence $$\{(\widetilde{py}_i)\}_{i=1}^{m}(\text{or } \{(\widetilde{px}_i)\}_{i=1}^{m})$$

and the sixth sequence $$\{(\tilde{x}_i)\}_{i=1}^{m}(\text{or } \{(\tilde{y}_i)\}_{i=1}^{m}),$$

and obtaining the event content information through processing performed based on the fifth sequence $$\{(\widetilde{py}_i)\}_{i=1}^{m}\ (\text{or } \{(\widetilde{px}_i)\}_{i=1}^{m}).$$

In a possible implementation, the plurality of sequences further include a fifth sequence and a sixth sequence, the fifth sequence and the sixth sequence include the space information of the event data in the event chunk, and the fifth sequence further includes the event content information of the event data in the event chunk. Step S82 further includes:

for any fifth sequence, converting each element in the fifth sequence by using an inverse function of a preset first function, to obtain a converted element;

performing summation on each converted element and all elements before the element, to obtain a fifth group of sum values;

processing a converted first element and each sum value in the fifth group of sum values by using an inverse function of a preset second function, to obtain event content information of each piece of event data and first-dimensional space information or second-dimensional space information of the event data;

for any sixth sequence, converting each element in the sixth sequence by using the inverse function of the preset first function, to obtain a converted element;

performing summation on each converted element and all elements before the element, to obtain a sixth group of sum values; and using a converted first element and each sum value in a converted sixth group of sum values as second-dimensional space information or first-dimensional space information of the event data in the event chunk corresponding to the sixth sequence.

For example, when the space information in the event chunk is obtained through processing performed based on the fifth sequence and the sixth sequence, and the event content information is obtained through processing performed based on the fifth sequence, inverse processing is performed based on a manner of obtaining the fifth sequence and the sixth sequence through processing the event chunk. For the manner of obtaining the fifth sequence and the sixth sequence through processing the event chunk, refer to the related description of step S22 in the foregoing data storage method part. In this case, when inverse processing is performed, for example, if the fifth sequence is {518, 4, 3, 4} and includes the second-dimensional space information of the event data, each element in the fifth sequence may be converted by using the inverse function of the preset first function (for example, the zigzag function in the conventional technologies). It is assumed that the zigzag function $$f(n) = \begin{cases} 2n, & n \geq 0 \\ -2n-1, & n < 0 \end{cases}$$

is used. {259, 2, −2, 2} may be obtained through conversion. Then, summation (for example, implemented by using the inverse function of the delta function in the conventional technologies) is performed on each element in {259, 2, −2, 2} and all elements before the element, to obtain a first group of sum values 261, 259, and 261. The first element 259 in {259, 2, −2, 2} and all sum values 261, 259, and 261 in the first group of sum values are processed by using the inverse function of the preset second function (for example, $py_i=y_i*2+p_i$). To be specific, 259, 261, 259, and 261 are respectively divided by 2 to obtain 129, 130, 129, and 130, and remainders are respectively 1, 1, 1, and 1. In this case, the second-dimensional information of the event data in the event chunk corresponding to the fifth sequence may be 129, 130, 129, and 130, and the event content information may be 1, 1, 1, and 1.

When the event content information and the second-dimensional space information are obtained through processing the fifth sequence, the first-dimensional space information may be obtained through processing the sixth sequence. For an example implementation, refer to the foregoing manner of obtaining the first-dimensional space information through processing the second sequence. Details are not described herein again.

When the event content information and the first-dimensional space information are obtained through processing the fifth sequence, a method for obtaining the event content information and the first-dimensional space information is the same as a method for obtaining the event content information and the second-dimensional space information through processing the fifth sequence. The second function $py_i=y_i*2+p_i$ is replaced with $px_i=x_i*2+p_i$, and the second-dimensional space information is replaced with the first-dimensional space information. Details are not described herein again. In this case, the second-dimensional space information may be obtained through processing the sixth sequence. For an example implementation, refer to the foregoing manner of obtaining the second-dimensional space information through processing the third sequence. Details are not described herein again.

In this manner, for each fifth sequence, space information and event content information in an event chunk corresponding to the fifth sequence may be obtained through processing; and for each sixth sequence, space information in an event chunk corresponding to the sixth sequence may be obtained through processing. The event chunk corresponding to the fifth sequence/the sixth sequence may be obtained with reference to time information in the event chunk corresponding to the fifth sequence/the sixth sequence. In this way, application of the data reading method is more flexible.

A person skilled in the art should understand that that the event data is in an integer form is used as an example above. If the event data includes a floating point number, in the data storage method, more compression manners may be correspondingly designed, and a storage manner of a data block and information included in a metadata block may remain unchanged. Correspondingly, in the data reading method, a manner of obtaining a data block and information included in a metadata block may remain unchanged, and more decompression manners may be correspondingly designed. In this way, even if the event data includes a floating point number, data storage costs can also be reduced during data storage, and data reading costs can also be reduced during data reading, thereby maintaining relatively high efficiency.

Figure 9:
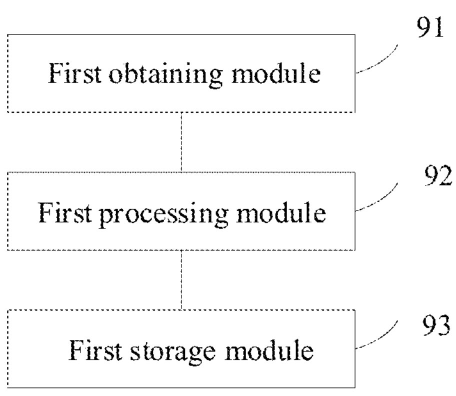
FIG. 9 is a diagram of an example structure of a data storage apparatus according to an embodiment of this disclosure.

FIG. 9 is a diagram of an example structure of a data storage apparatus according to an embodiment of this disclosure.

As shown in FIG. 9, in a possible implementation, this disclosure provides a data storage apparatus. The apparatus is used in a processor. The apparatus includes: a first obtaining module 91, configured to obtain event data; a first processing module 92, configured to process the event data, to obtain a plurality of data blocks and a plurality of corresponding metadata blocks, where each data block includes a part of processed event data, and each metadata block includes a start time, an end time, a quantity, and a compression manner of event data in a data block corresponding to the metadata block, and a storage address of the data block; and a first storage module 93, configured to store the plurality of data blocks into a first storage area, and store the plurality of metadata blocks into a second storage area.

In a possible implementation, the processing the event data, to obtain a plurality of data blocks and a plurality of corresponding metadata blocks includes: performing chunking on the event data based on time information and/or space information in the event data, to obtain a plurality of event chunks; processing each event chunk, to obtain a plurality of sequences, where the plurality of sequences include time information, space information, and event content information of event data in the event chunk, a quantity of elements in each sequence is equal to a quantity of pieces of event data in the event chunk, an element value in each sequence is an integer greater than or equal to 0, and a quantity of elements whose element values are greater than a first threshold is greater than a quantity of elements whose element values are less than or equal to the first threshold; for each sequence, selecting, from a preset compression manner, a compression manner matching the sequence, and compressing the sequence based on the selected compression manner, to obtain compressed data; obtaining one data block based on a plurality of pieces of compressed data obtained based on the plurality of sequences corresponding to each event chunk; and obtaining, based on time information in event data included in each event chunk, a quantity of pieces of event data, a selected compression manner, and a storage address of the data block, to obtain one metadata block corresponding to the data block.

In a possible implementation, the plurality of sequences include a first sequence, and the first sequence includes the time information of the event data in the event chunk. The processing each event chunk, to obtain a plurality of sequences includes: sorting the event data in the event chunk based on a time information order, and performing subtraction between time information of each piece of event data and time information of a previous piece of event data, to obtain a first group of differences; and using time information of event data ranking first and all differences in the first group of differences respectively as elements in the first sequence, to obtain the first sequence.

In a possible implementation, the plurality of sequences further include a second sequence, a third sequence, and a fourth sequence. The second sequence includes first-dimensional space information of the event data in the event chunk. The third sequence includes second-dimensional space information of the event data in the event chunk. The fourth sequence includes the event content information of the event data in the event chunk. The processing each event chunk, to obtain a plurality of sequences further includes: performing subtraction between first-dimensional space information of each piece of event data and first-dimensional space information of a previous piece of event data, to obtain a second group of differences; converting, by using a preset first function, a negative number in first-dimensional space information of the event data ranking first and the second group of differences into a positive number; obtaining the second sequence based on converted first-dimensional space information of the event data ranking first and each difference in a converted second group of differences; performing subtraction between second-dimensional space information of each piece of event data and second-dimensional space information of the previous piece of event data, to obtain a third group of differences; converting, by using the preset first function, a negative number in second-dimensional space information of the event data ranking first and the third group of differences into a positive number; obtaining the third sequence based on converted second-dimensional space information of the event data ranking first and each difference in a converted third group of differences; performing subtraction between event content information of each piece of event data and event content information of the previous piece of event data, to obtain a fourth group of differences; converting, by using the preset first function, a negative number in event content information of the event data ranking first and the fourth group of differences into a positive number; and obtaining the fourth sequence based on converted event content information of the event data ranking first and each difference in a converted fourth group of differences.

In a possible implementation, the plurality of sequences further include a fifth sequence and a sixth sequence. The fifth sequence and the sixth sequence include the space information of the event data in the event chunk. The fifth sequence further includes the event content information of the event data in the event chunk. The processing each event chunk, to obtain a plurality of sequences further includes: processing event content information of each piece of event data and first-dimensional space information or second-dimensional space information of the event data by using a preset second function, to obtain synthetic information; performing subtraction between synthetic information of each piece of event data and synthetic information of a previous piece of event data, to obtain a fifth group of differences; converting, by using a preset first function, a negative number in synthetic information of the event data ranking first and the fifth group of differences into a positive number; obtaining the fifth sequence based on converted synthetic information of the event data ranking first and each difference in a converted fifth group of differences; performing subtraction between second-dimensional space information of each piece of event data and second-dimensional space information of the previous piece of event data, or performing subtraction between first-dimensional space information of each piece of event data and first-dimensional space information of the previous piece of event data, to obtain a sixth group of differences; converting, by using the preset first function, a negative number in second-dimensional information or first-dimensional information of the event data ranking first and the sixth group of differences into a positive number; and obtaining the sixth sequence based on converted second-dimensional information or first-dimensional information of the event data ranking first and each difference in a converted sixth group of differences.

In a possible implementation, when values of all elements in the sequence are the same and bit widths of all the elements are all b, the preset compression manner includes a first compression manner. In the first compression manner, the values of all the elements in the sequence are recorded by using a b-bit binary number. A value of b is recorded by using a B-bit binary number. Herein, both b and B are positive integers.

In a possible implementation, when a largest bit width of elements in the sequence is b, the preset compression manner includes a second compression manner. In the second compression manner, a value of each element in the sequence is recorded by using a b-bit binary number. A value of b is recorded by using a B-bit binary number. Herein, both b and B are positive integers.

In a possible implementation, when bit widths of at least two elements in the sequence are different, and a largest bit width of elements in the sequence is b, the preset compression manner includes a third compression manner. In the third compression manner, a less than b is set, values of b and a each are recorded by using a B-bit binary number, low-a-bit data in a binary form of each element in the sequence is recorded by using a binary number whose bit width is equal to a, high-(b-a)-bit data in the binary form of the element in the sequence is recorded by using a binary number whose bit width is equal to b-a, and whether each element includes high-(b-a)-bit data is recorded by using a binary number whose bit width is equal to a quantity of elements in the sequence. Herein, b, B, and a are all positive integers.

Figure 10:
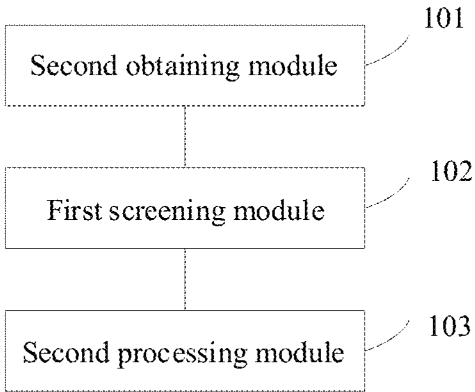
FIG. 10 is a diagram of an example structure of a data reading apparatus according to an embodiment of this disclosure.

FIG. 10 is a diagram of an example structure of a data reading apparatus according to an embodiment of this disclosure.

As shown in FIG. 10, in a possible implementation, this disclosure provides a data reading apparatus. The apparatus is used in a processor. The apparatus includes: a second obtaining module 101, configured to obtain a plurality of metadata blocks from a second storage area, where the plurality of metadata blocks correspond to a plurality of data blocks, each data block includes a part of processed event data, and each metadata block includes a start time, an end time, a quantity, and a compression manner of event data in a data block corresponding to the metadata block, and a storage address of the data block; a first screening module 102, configured to find, in the plurality of metadata blocks, at least one metadata block that includes a start time and an end time between which any time point is in a target time interval; and a second processing module 103, configured to obtain, from a first storage area based on a storage address in the at least one found metadata block, at least one data block corresponding to the at least one found metadata block, and process the data block based on a compression manner in a found metadata block corresponding to each data block, to obtain to-be-read event data.

In a possible implementation, the processing the data block based on a compression manner in a found metadata block corresponding to each data block, to obtain to-be-read event data includes: performing decompression processing on the data block based on the compression manner in the found metadata block corresponding to each data block, to obtain a plurality of decompressed sequences, where the plurality of sequences include time information, space information, and event content information of event data in an event chunk corresponding to the data block, a quantity of elements in each sequence is equal to a quantity of pieces of event data in the event chunk, an element value in each sequence is an integer greater than or equal to 0, and a quantity of elements whose element values are greater than a first threshold is greater than a quantity of elements whose element values are less than or equal to the first threshold; processing the plurality of decompressed sequences obtained through decompression processing performed on each data block, to obtain the event chunk corresponding to each data block; and using, as the read event data, event data that is in event data included in all event chunks and whose time information is in the target time interval.

In a possible implementation, the plurality of sequences include a first sequence. The first sequence includes the time information of the event data in the event chunk. The processing the plurality of decompressed sequences obtained through decompression processing performed on each data block, to obtain the event chunk corresponding to each data block includes: for any first sequence, performing summation on each element in the first sequence and all elements before the element, to obtain a first group of sum values; and using a first element in the first sequence and all sum values in the first group of sum values respectively as the time information of the event data in the event chunk corresponding to the first sequence.

In a possible implementation, the plurality of sequences further include a second sequence, a third sequence, and a fourth sequence. The second sequence includes first-dimensional space information of the event data in the event chunk. The third sequence includes second-dimensional space information of the event data in the event chunk. The fourth sequence includes the event content information of the event data in the event chunk. The processing the plurality of decompressed sequences obtained through decompression processing performed on each data block, to obtain the event chunk corresponding to each data block further includes: for any second sequence, third sequence, or fourth sequence, converting each element in the second sequence, the third sequence, or the fourth sequence by using an inverse function of a preset first function, to obtain a converted element; performing summation on each converted element and all elements before the element, to obtain a second group of sum values, a third group of sum values, or a fourth group of sum values; and using a converted first element and each sum value in a converted second group of sum values as the first-dimensional space information of the event data in the event chunk corresponding to the second sequence, or using a converted first element and each sum value in a converted third group of sum values as the second-dimensional space information of the event data in the event chunk corresponding to the third sequence, or using a converted first element and each sum value in a converted fourth group of sum values as the event content information of the event data in the event chunk corresponding to the fourth sequence.

In a possible implementation, the plurality of sequences further include a fifth sequence and a sixth sequence. The fifth sequence and the sixth sequence include the space information of the event data in the event chunk. The fifth sequence further includes the event content information of the event data in the event chunk. The processing the plurality of decompressed sequences obtained through decompression processing performed on each data block, to obtain the event chunk corresponding to each data block further includes: for any fifth sequence, converting each element in the fifth sequence by using an inverse function of a preset first function, to obtain a converted element; performing summation on each converted element and all elements before the element, to obtain a fifth group of sum values; processing a converted first element and each sum value in the fifth group of sum values by using an inverse function of a preset second function, to obtain event content information of each piece of event data and first-dimensional space information or second-dimensional space information of the event data; for any sixth sequence, converting each element in the sixth sequence by using the inverse function of the preset first function, to obtain a converted element; performing summation on each converted element and all elements before the element, to obtain a sixth group of sum values; and using a converted first element and each sum value in a converted sixth group of sum values as second-dimensional space information or first-dimensional space information of the event data in the event chunk corresponding to the sixth sequence.

In a possible implementation, the data block includes a plurality of pieces of compressed data. The performing decompression processing on the data block based on the compression manner in the found metadata block corresponding to each data block, to obtain a plurality of decompressed sequences includes: when the compression manner corresponding to the metadata block indicates that a compression manner of any compressed data is a first compression manner, reading a B-bit binary number from the compressed data; determining a value of b based on a decimal form of the B-bit binary number, and further reading a b-bit binary number from the compressed data; and using a decimal form of the b-bit binary number as a value of each element in the sequence, to obtain a decompressed sequence, where both b and B are positive integers.

In a possible implementation, the data block includes a plurality of pieces of compressed data, and the performing decompression processing on the data block based on the compression manner in the found metadata block corresponding to each data block, to obtain a plurality of decompressed sequences includes: when the compression manner corresponding to the metadata block indicates that a compression manner of any compressed data is a second compression manner, reading a B-bit binary number from the compressed data; determining a value of b based on a decimal form of the B-bit binary number; further sequentially reading a b-bit binary number from the compressed data until a quantity of read b-bit binary numbers is equal to a quantity that is of pieces of event data and that is indicated by the metadata block; and using a decimal form of the sequentially read b-bit binary number as a value of each element in the sequence, to obtain a decompressed sequence, where both b and B are positive integers.

In a possible implementation, the data block includes a plurality of pieces of compressed data, and the performing decompression processing on the data block based on the compression manner in the found metadata block corresponding to each data block, to obtain a plurality of decompressed sequences includes: when the compression manner corresponding to the metadata block indicates that a compression manner of any compressed data is a third compression manner, sequentially reading two B-bit binary numbers from the compressed data; determining a value of b and a value of a respectively based on decimal forms of the two B-bit binary numbers; further sequentially reading an a-bit binary number from the compressed data until a quantity of read a-bit binary numbers is equal to a quantity that is of pieces of event data and that is indicated by the metadata block; using the sequentially read a-bit binary number as low a bits of each element in the sequence; further reading, from the compressed data, a binary number whose bit width is equal to the quantity that is of pieces of event data and that is indicated by the metadata block, and determining, based on each bit of the binary number, whether each element in the sequence includes high-(b-a)-bit data; further sequentially reading a (b-a)-bit binary number from the compressed data until a quantity of read (b-a)-bit binary numbers is equal to a quantity of determined elements that each include high-(b-a)-bit data; and using the read (b-a)-bit binary number as high b-a bits of an element that includes high-(b-a)-bit data in the sequence, where b, B, and a are all positive integers.

An embodiment of this disclosure provides a data storage apparatus, including a processor and a memory that is configured to store executable instructions of the processor, where the processor is configured to implement the foregoing data storage method when executing the instructions.

An embodiment of this disclosure provides a data reading apparatus, including a processor and a memory that is configured to store executable instructions of the processor, where the processor is configured to implement the foregoing data reading method when executing the instructions.

An embodiment of this disclosure provides a nonvolatile computer-readable storage medium. The nonvolatile computer-readable storage medium stores computer program instructions. When the computer program instructions are executed by a processor, the foregoing data storage method or data reading method is implemented.

An embodiment of this disclosure provides a computer program product, including computer-readable code or a nonvolatile computer-readable storage medium carrying computer-readable code. When the computer-readable code runs in a processor of an electronic device, the processor in the electronic device performs the foregoing data storage method or data reading method.

Figure 11:
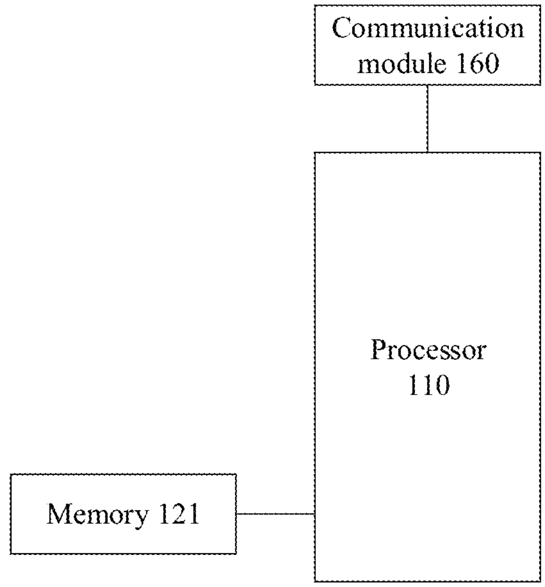
FIG. 11 is a diagram of an example structure of a data storage apparatus or a data reading apparatus according to an embodiment of this disclosure.

FIG. 11 is a diagram of an example structure of a data storage apparatus or a data reading apparatus according to an embodiment of this disclosure.

As shown in FIG. 11, the data storage apparatus (or the data reading apparatus) may include at least one of a mobile phone, a foldable electronic device, a tablet computer, a desktop computer, a laptop computer, a handheld computer, a notebook computer, an ultra-mobile personal computer (UMPC), a netbook, a cellular phone, a personal digital assistant (PDA), an augmented reality (, AR) device, a virtual reality (VR) device, an artificial intelligence (AI) device, a wearable device, an in-vehicle device, a smart home device, a smart city device, or a server device. A specific type of the data storage apparatus (or the data reading apparatus) is not specifically limited in this embodiment of this disclosure.

The data storage apparatus (or the data reading apparatus) may include a processor 110, a memory 121, and a communication module 160. It may be understood that the structure shown in this embodiment of this disclosure does not constitute a specific limitation on the data storage apparatus (or the data reading apparatus). In some other embodiments of this disclosure, the data storage apparatus (or the data reading apparatus) may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (n, NPU), and/or the like. Different processing units may be independent components, or may be integrated into one or more processors.

The processor may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 may be a cache. The memory may store instructions or data that is used by the processor 110 or that is used frequently, for example, a data block and a metadata block in this embodiment of this disclosure. If the processor 110 needs to use the instructions or the data, the processor 110 may directly invoke the instructions or the data from the memory. This avoids repeated access, reduces a waiting time of the processor 110, and improves system efficiency.

The memory 121 may be configured to store computer-executable program code. The executable program code includes instructions. The memory 121 may include a program storage area and a data storage area. The program storage area may store an operating system, an application (for example, a preset compression manner) required by at least one function, and the like. The data storage area may store data (for example, a data block, a metadata block, or a sequence) created in a process of using the data storage apparatus (or the data reading apparatus), and the like. In addition, the memory 121 may include a high-speed random access memory, or may include a non-volatile memory, for example, at least one magnetic disk storage device, a flash memory, or a universal flash storage (UFS). The processor 110 executes various function methods of the data storage apparatus (or the data reading apparatus) or the foregoing data storage method (or the data reading method) by running the instructions stored in the memory 121 and/or the instructions stored in the memory disposed in the processor.

The communication module 160 may be configured to: receive data (for example, event data in this embodiment of this disclosure) from another apparatus or device in a wireless communication/wired communication manner, and output data to the another apparatus or device. For example, a wireless communication solution including a WLAN (for example, a Wi-Fi network), Bluetooth (BT), a global navigation satellite system (GNSS), frequency modulation (FM), near field wireless communication (NFC) technology, and an infrared (IR) technology may be provided.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory ( ), an erasable programmable read-only memory (, EPROM or a flash memory), a static random-access memory (SRAM), a portable compact disk read-only memory (CD-ROM), a digital video disc (DVD), a memory stick, a floppy disk, a mechanical coding device, for example, a punching card or a groove protrusion structure that stores instructions, and any suitable combination thereof.

Computer-readable program instructions or code described herein can be downloaded to respective computing/processing devices from a computer-readable storage medium, or downloaded to an external computer or external storage device via a network, such as the Internet, a local area network, a wide area network and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instructions from the network and forwards the computer-readable program instructions for storage in a computer-readable storage medium in each computing/processing device.

The computer program instructions used to perform operations in this disclosure may be an assembly instruction, an instruction set architecture (instruction set architecture, ISA) instruction, a machine instruction, a machine-related instruction, microcode, a firmware instruction, status setting data, or source code or target code written in any combination of one or more programming languages. The programming languages include an object-oriented programming language such as Smalltalk and C++, and a conventional procedural programming language such as a C language or a similar programming language. The computer-readable program instructions may be executed all on a user computer, executed partially on a user computer, executed as a standalone software package, executed partially on a user computer and partially on a remote computer, or executed all on a remote computer or a server. In a case involving a remote computer, the remote computer may be connected to a user computer through any type of network, including a local area network (LAN) or a wide area network (WAN), or may be connected to an external computer (for example, through the Internet by using an Internet service provider). In some embodiments, an electronic circuit, for example, a programmable logic circuit, a field-programmable gate array (FPGA), or a programmable logic array (PLA), is customized by using status information of the computer-readable program instructions. The electronic circuit may execute the computer-readable program instructions, to implement various aspects of this disclosure.

The various aspects of this disclosure are described herein with reference to the flowcharts and/or block diagrams of the method, the apparatus (system), and the computer program product according to embodiments of this disclosure. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a dedicated computer, or another programmable data processing apparatus to produce a machine, so that when the instructions are executed by the processor of the computer or the another programmable data processing apparatus, an apparatus for implementing functions/actions specified in one or more blocks in the flowcharts and/or block diagrams is generated. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing the various aspects of the functions/actions specified in the one or more blocks in the flowcharts and/or block diagrams.

The computer-readable program instructions may alternatively be loaded onto a computer, another programmable data processing apparatus, or another device, so that a series of operation steps are executed on the computer, the another programmable data processing apparatus, or the another device to produce a computer-implemented process. Therefore, the instructions executed on the computer, the another programmable data processing apparatus, or the another device implement the functions/actions specified in the one or more blocks in the flowcharts and/or block diagrams.

The flowcharts and block diagrams in the accompanying drawings show possible implementations of system architectures, functions, and operations of apparatuses, systems, methods, and computer program products according to a plurality of embodiments of this disclosure. In this regard, each block in the flowcharts or block diagrams may represent a module, a program segment, or a part of the instructions, and the module, the program segment, or the part of the instructions includes one or more executable instructions for implementing a specified logical function. In some alternative implementations, a function marked in the block may also occur in an order different from that marked in the accompanying drawings. For example, two consecutive blocks may actually be executed substantially in parallel, and may sometimes be executed in a reverse order, depending on a related function.

It should also be noted that, each block in the block diagrams and/or flowcharts, and a combination of blocks in the block diagrams and/or flowcharts may be implemented by hardware (for example, a circuit or an ASIC (application-specific integrated circuit)) that performs a corresponding function or action, or may be implemented by a combination of hardware and software, for example, firmware.

Although the present invention is described with reference to embodiments, in a process of implementing the present invention that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce good effect.

The foregoing has described embodiments of this disclosure. The foregoing descriptions are examples, not exhaustive, and are not limited to the disclosed embodiments. Without departing from the scope of the described embodiments, many modifications and variations are apparent to a person of ordinary skill in the technical field. Selection of terms used in this specification is intended to best explain the principles of the embodiments, actual application, or improvements to technologies in the market, or to enable another person of ordinary skill in the art to understand the embodiments disclosed in this specification.

What is claimed is:

1. A data storage method, wherein the method comprises:

obtaining event data;

processing the event data, to obtain a plurality of data blocks and a plurality of corresponding metadata blocks, wherein each data block of the plurality of data blocks comprises a part of processed event data, and each metadata block of the plurality of corresponding metadata blocks comprises a start time, an end time, a quantity, and a compression manner of event data in a data block corresponding to the metadata block, and a storage address of the data block; and storing the plurality of data blocks into a first storage area, and storing the plurality of metadata blocks into a second storage area, wherein the processing the event data, to obtain the plurality of data blocks and the plurality of corresponding metadata blocks comprises:

performing chunking on the event data based on time information and/or space information in the event data, to obtain a plurality of event chunks;

processing each event chunk of the plurality of event chunks, to obtain a plurality of sequences, wherein the plurality of sequences comprise time information, space information, and event content information of event data in the event chunk, a quantity of elements in each sequence is equal to a quantity of pieces of event data in the event chunk, an element value in each sequence of the plurality of sequences is an integer greater than or equal to 0, and a quantity of elements having element values greater than a first threshold value is greater than a quantity of elements having element values less than or equal to the first threshold value;

for each sequence, of the plurality of sequences selecting, from a preset compression manner, a compression manner matching the sequence, and compressing the sequence based on the selected compression manner, to obtain compressed data;

obtaining one data block based on a plurality of pieces of compressed data obtained based on the plurality of sequences corresponding to each event chunk; and obtaining, based on time information in event data comprised in each event chunk, a quantity of pieces of event data, a selected compression manner, and a storage address of the data block, to obtain one metadata block corresponding to the data block.

2. The data storage method according to claim 1, wherein the plurality of sequences comprise a first sequence, and the first sequence comprises the time information of the event data in the event chunk; and the processing each event chunk, to obtain a plurality of sequences comprises:

sorting the event data in the event chunk based on a time information order, and performing subtraction between time information of each piece of event data and time information of a previous piece of event data, to obtain a first group of differences; and using time information of event data ranking first and all differences in the first group of differences respectively as elements in the first sequence, to obtain the first sequence.

3. The data storage method according to claim 2, wherein the plurality of sequences further comprise a second sequence, a third sequence, and a fourth sequence, the second sequence comprises first-dimensional space information of the event data in the event chunk, the third sequence comprises second-dimensional space information of the event data in the event chunk, and the fourth sequence comprises the event content information of the event data in the event chunk; and the processing each event chunk, to obtain a plurality of sequences further comprises:

performing subtraction between first-dimensional space information of each piece of event data and first-dimensional space information of the previous piece of event data, to obtain a second group of differences;

converting, using a preset first function, a negative number in first-dimensional space information of the event data ranking first and the second group of differences into a positive number;

obtaining the second sequence based on converted first-dimensional space information of the event data ranking first and each difference in a converted second group of differences;

performing subtraction between second-dimensional space information of each piece of event data and second-dimensional space information of the previous piece of event data, to obtain a third group of differences;

converting, using the preset first function, a negative number in second-dimensional space information of the event data ranking first and the third group of differences into a positive number;

obtaining the third sequence based on converted second-dimensional space information of the event data ranking first and each difference in a converted third group of differences;

performing subtraction between event content information of each piece of event data and event content information of the previous piece of event data, to obtain a fourth group of differences;

converting, using the preset first function, a negative number in event content information of the event data ranking first and the fourth group of differences into a positive number; and obtaining the fourth sequence based on converted event content information of the event data ranking first and each difference in a converted fourth group of differences.

4. The data storage method according to claim 2, wherein the plurality of sequences further comprise a fifth sequence and a sixth sequence, the fifth sequence and the sixth sequence comprise the space information of the event data in the event chunk, and the fifth sequence further comprises the event content information of the event data in the event chunk; and the processing each event chunk, to obtain a plurality of sequences further comprises:

processing event content information of each piece of event data and first-dimensional space information or second-dimensional space information of the event data using a preset second function, to obtain synthetic information;

performing subtraction between synthetic information of each piece of event data and synthetic information of a previous piece of event data, to obtain a fifth group of differences;

converting, using a preset first function, a negative number in synthetic information of the event data ranking first and the fifth group of differences into a positive number;

obtaining the fifth sequence based on converted synthetic information of the event data ranking first and each difference in a converted fifth group of differences;

performing subtraction between second-dimensional space information of each piece of event data and second-dimensional space information of the previous piece of event data, or performing subtraction between first-dimensional space information of each piece of event data and first-dimensional space information of the previous piece of event data, to obtain a sixth group of differences;

converting, using the preset first function, a negative number in second-dimensional information or first-dimensional information of the event data ranking first and the sixth group of differences into a positive number; and obtaining the sixth sequence based on converted second-dimensional information or first-dimensional information of the event data ranking first and each difference in a converted sixth group of differences.

5. The data storage method according to claim 1, wherein based on values of all elements in the sequence being the same and bit widths of all the elements being all b, the preset compression manner comprises a first compression manner; and in the first compression manner, the values of all the elements in the sequence are recorded using a b-bit binary number, and a value of b is recorded using a B-bit binary number, wherein both b and B are positive integers.

6. The data storage method according to claim 1, wherein based on a largest bit width of elements in the sequence being b, the preset compression manner comprises a second compression manner; and in the second compression manner, a value of each element in the sequence is recorded using a b-bit binary number, and a value of b is recorded using a B-bit binary number, wherein both b and B are positive integers.

7. The data storage method according to claim 1, wherein based on bit widths of at least two elements in the sequence being different, and a largest bit width of elements in the sequence being b, the preset compression manner comprises a third compression manner; and in the third compression manner, a less than b is set, values of b and a each are recorded using a B-bit binary number, low-a-bit data in a binary form of each element in the sequence is recorded using a binary number having a bit width equal to a, high-(b-a)-bit data in the binary form of the element in the sequence is recorded using a binary number having a bit width equal to b-a, and whether each element comprises high-(b-a)-bit data is recorded using a binary number having a bit width equal to a quantity of elements in the sequence, wherein b, B, and a are all positive integers.

8. A data reading method, wherein the method comprises:

obtaining a plurality of metadata blocks from a second storage area, wherein the plurality of metadata blocks correspond to a plurality of data blocks, each data block of the plurality of data blocks comprises a part of processed event data, and each metadata block of the plurality of metadata blocks comprises a start time, an end time, a quantity, and a compression manner of event data in a data block corresponding to the metadata block, and a storage address of the data block;

finding, in the plurality of metadata blocks, at least one metadata block that comprises a start time and an end time between which any time point is in a target time interval; and obtaining, from a first storage area based on a storage address in the at least one found metadata block, at least one data block corresponding to the at least one found metadata block, and processing the data block based on a compression manner in a found metadata block corresponding to each data block, to obtain to-be-read event data, wherein the processing the data block based on the compression manner in the found metadata block corresponding to each data block, to obtain to-be-read event data comprises:

performing decompression processing on the data block based on the compression manner in the found metadata block corresponding to each data block, to obtain a plurality of decompressed sequences, wherein the plurality of sequences comprise time information, space information, and event content information of event data in an event chunk corresponding to the data block, a quantity of elements in each sequence is equal to a quantity of pieces of event data in the event chunk, an element value in each sequence is an integer greater than or equal to 0, and a quantity of elements having element values greater than a first threshold value is greater than a quantity of elements having element values less than or equal to the first threshold value;

processing the plurality of decompressed sequences obtained through decompression processing performed on each data block, to obtain the event chunk corresponding to each data block; and using, as the read event data, event data that is in event data comprised in all event chunks and whose time information is in the target time interval.

9. The data reading method according to claim 8, wherein the plurality of sequences comprise a first sequence, and the first sequence comprises the time information of the event data in the event chunk; and the processing the plurality of decompressed sequences obtained through decompression processing performed on each data block, to obtain the event chunk corresponding to each data block comprises:

for any first sequence, performing summation on each element in the first sequence and all elements before the element, to obtain a first group of sum values; and using a first element in the first sequence and all sum values in the first group of sum values respectively as the time information of the event data in the event chunk corresponding to the first sequence.

10. The data reading method according to claim 9, wherein the plurality of sequences further comprise a second sequence, a third sequence, and a fourth sequence, the second sequence comprises first-dimensional space information of the event data in the event chunk, the third sequence comprises second-dimensional space information of the event data in the event chunk, and the fourth sequence comprises the event content information of the event data in the event chunk; and the processing the plurality of decompressed sequences obtained through decompression processing performed on each data block, to obtain the event chunk corresponding to each data block further comprises:

for any second sequence, third sequence, or fourth sequence, converting each element in the second sequence, the third sequence, or the fourth sequence by using an inverse function of a preset first function, to obtain a converted element;

performing summation on each converted element and all elements before the element, to obtain a second group of sum values, a third group of sum values, or a fourth group of sum values; and using a converted first element and each sum value in a converted second group of sum values as the first-dimensional space information of the event data in the event chunk corresponding to the second sequence, or using a converted first element and each sum value in a converted third group of sum values as the second-dimensional space information of the event data in the event chunk corresponding to the third sequence, or using a converted first element and each sum value in a converted fourth group of sum values as the event content information of the event data in the event chunk corresponding to the fourth sequence.

11. The data reading method according to claim 9, wherein the plurality of sequences further comprise a fifth sequence and a sixth sequence, the fifth sequence and the sixth sequence comprise the space information of the event data in the event chunk, and the fifth sequence further comprises the event content information of the event data in the event chunk; and the processing the plurality of decompressed sequences obtained through decompression processing performed on each data block, to obtain the event chunk corresponding to each data block further comprises:

for any fifth sequence, converting each element in the fifth sequence by using an inverse function of a preset first function, to obtain a converted element;

performing summation on each converted element and all elements before the element, to obtain a fifth group of sum values;

processing a converted first element and each sum value in the fifth group of sum values by using an inverse function of a preset second function, to obtain event content information of each piece of event data and first-dimensional space information or second-dimensional space information of the event data;

for any sixth sequence, converting each element in the sixth sequence by using the inverse function of the preset first function, to obtain a converted element;

performing summation on each converted element and all elements before the element, to obtain a sixth group of sum values; and using a converted first element and each sum value in a converted sixth group of sum values as second-dimensional space information or first-dimensional space information of the event data in the event chunk corresponding to the sixth sequence.

12. The data reading method according to claim 8, wherein the data block comprises a plurality of pieces of compressed data, and the performing decompression processing on the data block based on the compression manner in the found metadata block corresponding to each data block, to obtain a plurality of decompressed sequences comprises:

based on the compression manner corresponding to the metadata block indicating that a compression manner of any compressed data is a first compression manner, reading a B-bit binary number from the compressed data;

determining a value of b based on a decimal form of the B-bit binary number, and further reading a b-bit binary number from the compressed data; and using a decimal form of the b-bit binary number as a value of each element in the sequence, to obtain a decompressed sequence, wherein both b and B are positive integers.

13. The data reading method according to claim 8, wherein the data block comprises a plurality of pieces of compressed data, and the performing decompression processing on the data block based on the compression manner in the found metadata block corresponding to each data block, to obtain a plurality of decompressed sequences comprises:

based on the compression manner corresponding to the metadata block indicating that a compression manner of any compressed data is a second compression manner, reading a B-bit binary number from the compressed data;

determining a value of b based on a decimal form of the B-bit binary number;

further sequentially reading a b-bit binary number from the compressed data until a quantity of read b-bit binary numbers is equal to a quantity that is of pieces of event data and that is indicated by the metadata block; and using a decimal form of the sequentially read b-bit binary number as a value of each element in the sequence, to obtain a decompressed sequence, wherein both b and B are positive integers.

14. The data reading method according to claim 8, wherein the data block comprises a plurality of pieces of compressed data, and the performing decompression processing on the data block based on the compression manner in the found metadata block corresponding to each data block, to obtain a plurality of decompressed sequences comprises:

based on the compression manner corresponding to the metadata block indicating that a compression manner of any compressed data is a third compression manner, sequentially reading two B-bit binary numbers from the compressed data;

determining a value of b and a value of a respectively based on decimal forms of the two B-bit binary numbers;

further sequentially reading a-bit binary number from the compressed data until a quantity of read a-bit binary numbers is equal to a quantity that is of pieces of event data and that is indicated by the metadata block;

using the sequentially read a-bit binary number as low a bits of each element in the sequence;

further reading, from the compressed data, a binary number whose bit width is equal to the quantity that is of pieces of event data and that is indicated by the metadata block, and determining, based on each bit of the binary number, whether each element in the sequence comprises high-(b-a)-bit data;

further sequentially reading a (b-a)-bit binary number from the compressed data until a quantity of read (b-a)-bit binary numbers is equal to a quantity of determined elements that each comprise high-(b-a)-bit data; and using the read (b-a)-bit binary number as high b-a bits of an element that comprises high-(b-a)-bit data in the sequence, wherein b, B, and a are all positive integers.

15. A data storage apparatus, comprising:

a processor; and a memory, configured to store instructions executable by the processor, wherein execution of the instructions by the processor causes the processor to:

obtain event data;

process the event data, to obtain a plurality of data blocks and a plurality of corresponding metadata blocks, wherein each data block of the plurality of data blocks comprises a part of processed event data, and each metadata block of the plurality of metadata blocks comprises a start time, an end time, a quantity, and a compression manner of event data in a data block corresponding to the metadata block, and a storage address of the data block; and store the plurality of data blocks into a first storage area, and store the plurality of metadata blocks into a second storage area, wherein execution of the instructions to process the event data, to obtain the plurality of data blocks and the plurality of corresponding metadata blocks causes the processor to:

perform chunking on the event data based on time information and/or space information in the event data, to obtain a plurality of event chunks;

process each event chunk of the plurality of event chunks, to obtain a plurality of sequences, wherein the plurality of sequences comprise time information, space information, and event content information of event data in the event chunk, a quantity of elements in each sequence is equal to a quantity of pieces of event data in the event chunk, an element value in each sequence of the plurality of sequences is an integer greater than or equal to 0, and a quantity of elements having element values greater than a first threshold value is greater than a quantity of elements having element values less than or equal to the first threshold value;

for each sequence, of the plurality of sequences select, from a preset compression manner, a compression manner matching the sequence, and compress the sequence based on the selected compression manner, to obtain compressed data;

obtain one data block based on a plurality of pieces of compressed data obtained based on the plurality of sequences corresponding to each event chunk; and obtain, based on time information in event data comprised in each event chunk, a quantity of pieces of event data, a selected compression manner, and a storage address of the data block, to obtain one metadata block corresponding to the data block.

16. A data reading apparatus, comprising:

a processor; and a memory, configured to store instructions executable by the processor, wherein execution of the instructions by the processor causes the processor to:

obtain a plurality of metadata blocks from a second storage area, wherein the plurality of metadata blocks correspond to a plurality of data blocks, each data block of the plurality of data blocks comprises a part of processed event data, and each metadata block of the plurality of metadata blocks comprises a start time, an end time, a quantity, and a compression manner of event data in a data block corresponding to the metadata block, and a storage address of the data block;

find, in the plurality of metadata blocks, at least one metadata block that comprises a start time and an end time between which any time point is in a target time interval; and obtain, from a first storage area based on a storage address in the at least one found metadata block, at least one data block corresponding to the at least one found metadata block, and process the data block based on a compression manner in a found metadata block corresponding to each data block, to obtain to-be-read event data, wherein execution of the instructions to process the data block based on the compression manner in the found metadata block corresponding to each data block, to obtain to-be-read event data causes the processor to:

perform decompression processing on the data block based on the compression manner in the found metadata block corresponding to each data block, to obtain a plurality of decompressed sequences, wherein the plurality of sequences comprise time information, space information, and event content information of event data in an event chunk corresponding to the data block, a quantity of elements in each sequence is equal to a quantity of pieces of event data in the event chunk, an element value in each sequence is an integer greater than or equal to 0, and a quantity of elements having element values greater than a first threshold value is greater than a quantity of elements having element values less than or equal to the first threshold value;

process the plurality of decompressed sequences obtained through decompression processing performed on each data block, to obtain the event chunk corresponding to each data block; and use, as the read event data, event data that is in event data comprised in all event chunks and whose time information is in the target time interval.

* * * * *